(12) United States Patent
He et al.

(10) Patent No.: US 10,713,794 B1
(45) Date of Patent: Jul. 14, 2020

(54) METHOD AND SYSTEM FOR USING MACHINE-LEARNING FOR OBJECT INSTANCE SEGMENTATION

(71) Applicant: Facebook, Inc., Menlo Park, CA (US)

(72) Inventors: Kaiming He, Menlo Park, CA (US); Georgia Gkioxari, Oakland, CA (US); Piotr Dollar, San Mateo, CA (US); Ross Girshick, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 267 days.

(21) Appl. No.: 15/922,734

(22) Filed: Mar. 15, 2018

Related U.S. Application Data

(60) Provisional application No. 62/472,571, filed on Mar. 16, 2017.

(51) Int. Cl.
*G06N 3/04* (2006.01)
*G06K 9/32* (2006.01)
*G06T 7/11* (2017.01)

(52) U.S. Cl.
CPC ............. *G06T 7/11* (2017.01); *G06K 9/3233* (2013.01); *G06N 3/0454* (2013.01); *G06T 2207/20081* (2013.01); *G06T 2210/12* (2013.01)

(58) Field of Classification Search
None
See application file for complete search history.

(56) References Cited

U.S. PATENT DOCUMENTS

2019/0253270 A1* 8/2019 Glaser ................ H04L 12/2814

OTHER PUBLICATIONS

M. Andriluka, L. Pishchulin, P. Gheler, and B. Schiele. 2D Human Pose Estimation: New Benchmark and State of the Art Analysis. http://www.researchgate.net/publication/269332682, Jun. 2014.
P. Arbeláez, J. Pont-Tuset, J.T. Barron, Ferran Marques, J. Malik. Multiscale Combinatorial Grouping, Jun. 2014.
A. Arnab and P. H.S Torr. Pixelwise Instance Segmentation with a Dynamically Instantiated Network. arXiv:1704.02386v1, Apr. 7, 2017.
M. Bai, R. Urtasun. Deep Watershed Transform for Instance Segmentation. arXiv:1611.08303v2, May 4, 2017.

(Continued)

*Primary Examiner* — Idowu O Osifade
(74) *Attorney, Agent, or Firm* — Baker Botts L.L.P.

(57) ABSTRACT

In one embodiment, a method includes a computing system accessing a training image. The system may generate a feature map for the training image using a first neural network. The system may identify a region of interest in the feature map and generate a regional feature map for the region of interest based on sampling locations defined by a sampling region. The sampling region and the region of interest may correspond to the same region in the feature map. The system may generate an instance segmentation mask associated with the region of interest by processing the regional feature map using a second neural network. The second neural network may be trained using the instance segmentation mask. Once trained, the second neural network is configured to generate instance segmentation masks for object instances depicted in images.

20 Claims, 20 Drawing Sheets
(6 of 20 Drawing Sheet(s) Filed in Color)

(56) References Cited

OTHER PUBLICATIONS

S. Bell, C. Lawrence Zitnick, K. Bala, R. Girshick. Inside-Outside Net: Detecting Objects in Context with Skip Pooling and Recurrent Neural Networks. arXiv:1512.04143v1, Dec. 14, 2015.

Z. Cao, T. Simon, S. Wei, Y. Sheikh. Realtime Multi-Person 2D Pose Estimation using Part Affinity Fields. arXiv:1611.08050v2, Apr. 14, 2017.

M. Cordts, M. Omran, S. Ramos, R. Rehfeld, M.Enzweiler, R. Benenson, U. Franke, S. Roth, and B. Schiele. The Cityscapes Dataset for Semantic Urban Scene Understanding. arXiv:1604.01685v2, Apr. 7, 2016.

J. Dai, K. He, Y. Li, S. Ren, and J. Sun. Instance-Sensitive Fully Convolutional Networks. arXiv:1603.08678v1, Mar. 29, 2016.

J. Dai, K. He, and J. Sun. Convolutional Feature Masking for Joint Object and Stuff Segmentation. arXiv:1412.1283v4, Apr. 2, 2015.

J. Dai, K. He, and J. Sun. Instance-aware Semantic Segmentation via Multi-task Network Cascades. arXiv:1512.04412v1, Dec. 14, 2015.

J. Dai, Y. Li, K. He, and J. Sun. R-FCN: Object Detection via Region-based Fully Convolutional Networks. arXiv:1605.06409v2, Jun. 21, 2016.

R. Girshick. Fast R-CNN. arXiv:1504.08083v2, Sep. 27, 2015.

R. Girshick, J. Donahue, T. Darrell, and J. Malik. Rich Feature Hierarchies for Accurate Object Detection and Semantic Segmentation. arXiv:1311.2524v5, Oct. 22, 2014.

R. Girshick, F. Iandola, T. Darrell, and J. Malik. Deformable Part Models are Convolutional Neural Networks. arXiv:1409.5403v2, Oct. 1, 2014.

B. Hariharan, P. Arbeláez, R. Girshick, and J. Malik. Simultaneous Detection and Segmentation. arXiv:1407.1808v1, Jul. 7, 2014.

B. Hariharan, P. Arbeláez, R. Girshick, and J. Malik. Hypercolumns for Objects Segmentation and Fine-grained Localization. arXiv:1411.5752v2, Apr. 25, 2015.

Z. Hayder, X. He, and M. Salzmann. Shape-aware Instance Segmentation. arXiv:1612.03129v1, Dec. 9, 2016.

K. He, G. Gkioxari, P. Dollár, R. Girshick. Mask R-CNN. arXiv:1703.06870v3, Jan. 24, 2018.

K. He, X. Zhang, S. Ren, and J. Sun. Spatial Pyramid Pooling in Deep Convolutional Networks for Visual Recognition. arXiv:1406.4729v4, Apr. 23, 2015.

K. He, X. Zhang, S. Ren, and J. Sun. Deep Residual Learning for Image Recognition. arXiv:1512.03385v1, Dec. 10, 2015.

J. Hosang, R. Benenson, P. Dollár, and B. Schiele. What Makes for Effective Detection Proposals?. arXiv:1502.05082v3, Aug. 1, 2015.

J. Huang, V. Rathod, C. Sun, M. Zhu, A. Korattikara, A. Fathi, I. Fischer, Z. Wojna, Y. Song, S. Guadarrama, et al. Speed/Accuracy Trade-offs for Modern Convolutional Object Detectors. arXiv:1611.10012v3, Apr. 25, 2017.

M. Jaderberg, K. Simonyan, A. Zisserman, and K. Kavukcuoglu. Spatial Transformer Networks. arXiv:1506.02025v3, Feb. 4, 2016.

A. Kirillov, E. Levinkov, B. Andres, B. Savchynskyy, and C. Rother. InstanceCut: from Edges to Instances with MiltiCut. arXiv:1611.08272v1, Nov. 24, 2016.

A. Krizhevsky, I. Sutskever, and G. Hinton. ImageNet Classification with Deep Convolutional Neural Networks, 2017.

Y. LeCun, B. Boser, J.S. Denker, D. Henderson, R. E. Howard, W. Hubbard, and L.D. Jackel. Backpropagation Applied to Handwritten Zip Code Recognition, Sep. 12, 1989.

Y. Li, H. Qi, J. Dai, X. Ji, and Y. Wei. Fully Convolutional Instance-aware Semantic Segmentation. arXiv:1611.07709v2, Apr. 10, 2017.

T. Y. Lin, P. Dollár, R. Girshick, K. He, B. Hariharan, and S. Belongie. Feature Pyramid Networks for Object Detection. arXiv:1612.03144v2, Apr. 19, 2017.

T.Y. Lin, M. Marie, S. Belongie, J. Hays, P. Perona, D. Ramanan. P. Dollár, and C. L. Zitnick. Microsoft COCO: Common Objects in Context. arXiv:1405.0312v3, Feb. 21, 2015.

S. Liu, J. Jia, S. Fidler, and R. Urtasun. SGN: Sequential Grouping Networks for Instance Segmentation, 2017.

J. Long, E. Shelhamer, and T. Darrell. Fully Convolutional Networks for Semantic Segmentation. arXiv:1411.4038v2, Mar. 8, 2015.

V. Nair and G. E. Hinton. Rectified Linear Units Improve Restricted Boltzmann Machines. Proceedings of the $27^{th}$ International Conference on Machine Learning, 2010.

G. Papandreou, T. Zhu, N. Kanazawa, A. Toshev, J. Tompson, C. Bregler, and K. Murphy. Towards Accurate Multi-person Pose Estimation in the Wild. arXiv:1701.01779v2, Apr. 14, 2017.

P. O. Pinheiro, R. Collobert, and P. Dollár. Learning to Segment Object Candidates. arXiv:1506.06204v2, Sep. 1, 2015.

P. O. Pinheiro, T.-Y. Lin, R. Collobert, and P. Dollár. Learning to Refine Object Segments. arXiv:1603.08695v2, Jul. 26, 2016.

I. Radosavovic, P. Dollár, R. Girshick, G. Gkioxari, and K. He. Data Distillation: Towards Omni-Supervised Learning. arXiv:1712.04440v1, Dec. 12, 2017.

S. Ren, K. He, R. Girshick, and J. Sun. Faster R-CNN: Towards Real-Time Object Detection with Region Proposal Networks, 2015.

S. Ren, K. He, R. Girshick, and J. Sun. Faster R-CNN: Towards Real-Time Object Detection with Region Proposal Networks. arXiv:1506.01497v3, Jan. 6, 2016.

A. Shrivastava, A. Gupta, and R. Girshick. Training Region-based Objects Detectors with Online Hard Example Mining. arXiv:1604.03540v1, Apr. 12, 2016.

A. Shrivastava, R. Sukthankar, J. Malik, and A. Gupta. Beyond Skip Connections: Top-Down Modulation for Object Detection. arXiv:1612.06851v2, Sep. 19, 2017.

C. Sun, A. Shrivastava, S. Singh, and A. Gupta. Revisiting Unreasonable Effectiveness of Data in Deep Learning Era. arXiv:1707.02968v2, Aug. 4, 2017.

C. Szegedy, S. Ioffe, and V. Vanhoucke. Inception-v4, Inception-ResNet and the Impact of Residual Connections on Learning. arXiv:1602.07261v2, Aug. 23, 2016.

J. R. Uijlings, K. E. van de Sande, T. Gevers, and A. W. Smeulders. Selective Search for Object Recognition. IJCV, 2012.

X. Wang, R. Girshick, A. Gupta, and K. He. Non-Local Neural Networks. arXiv:1711.07971v2, Nov. 24, 2017.

S.-E. Wei, V. Ramakrishna, T. Kanade, and Y. Sheikh. Convolutional Pose Machines. arXiv:1602.00134v4, Apr. 12, 2016.

S. Xie, R. Girshick, P. Dollár, Z. Tu, and K. He. Aggregated Residual Transformations for Deep Neural Networks. arXiv:1611.05431v2, Apr. 11, 2017.

\* cited by examiner

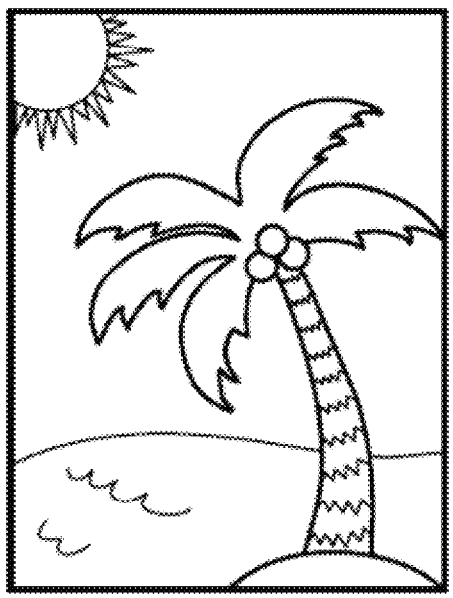 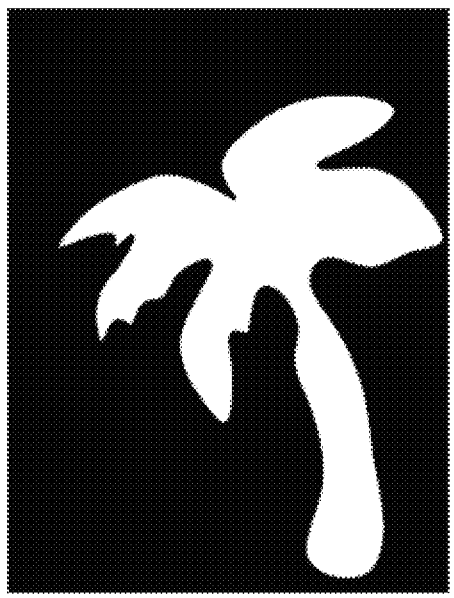
*FIG. 6A*
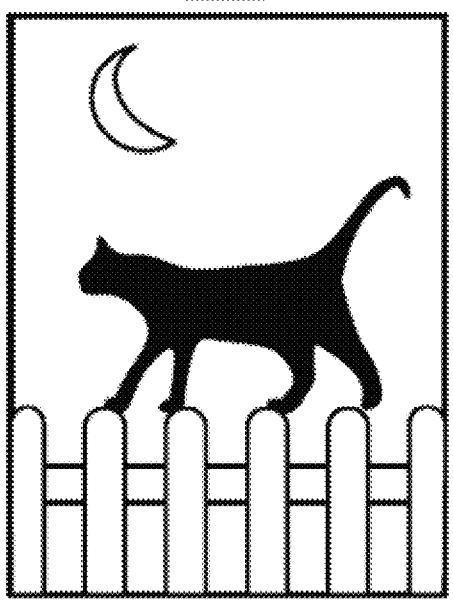 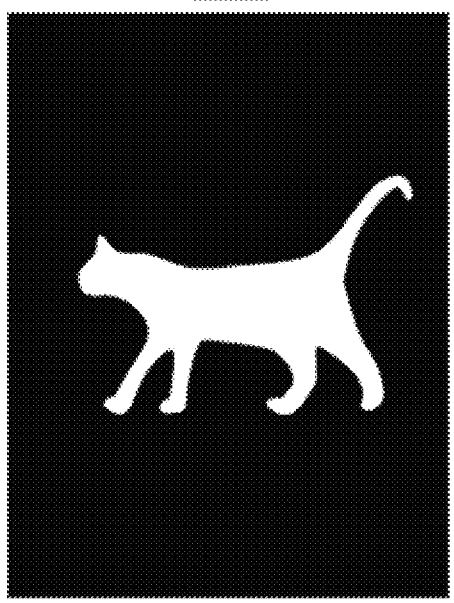
*FIG. 6B*

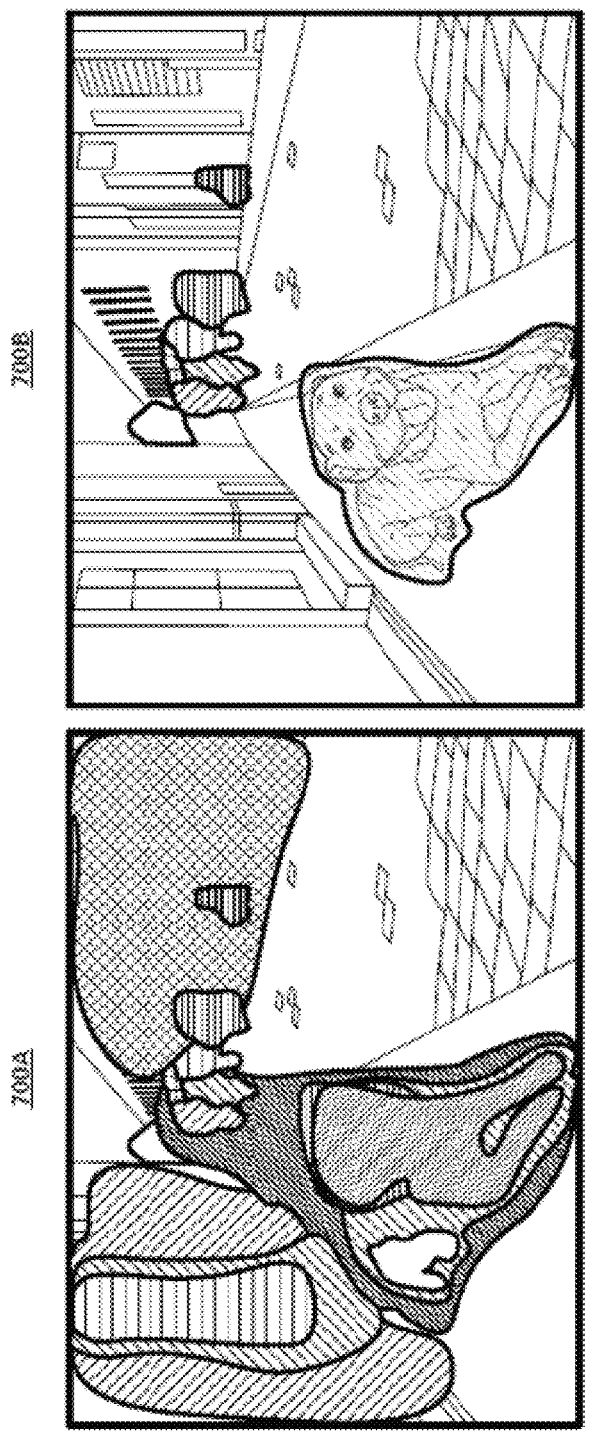

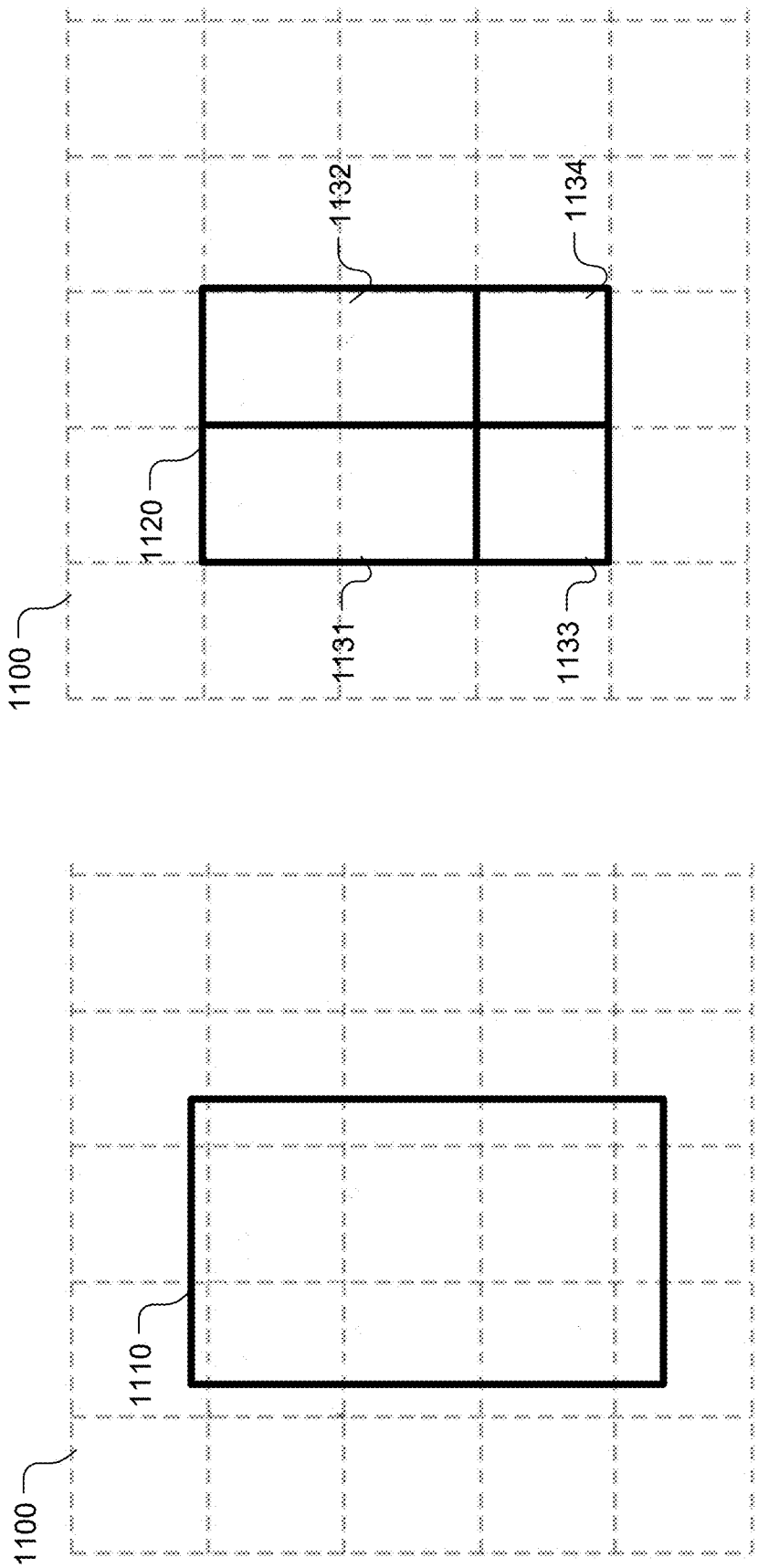

METHOD AND SYSTEM FOR USING MACHINE-LEARNING FOR OBJECT INSTANCE SEGMENTATION

PRIORITY

This application claims the benefit, under 35 U.S.C. § 119(e), of U.S. Provisional Patent Application No. 62/472,571, filed 16 Mar. 2017, which is incorporated herein by reference.

TECHNICAL FIELD

This disclosure relates generally to computer vision and more specifically to object detection and segmentation in images.

BACKGROUND

Although a human viewing an image may be able to readily discern what the image depicts, the same cannot be said of machines. An image that is stored digitally is represented as a series of 0's and 1's (or bits). At a higher level of abstraction, an image is made up of a collection of pixels, which have no interdependency. Each pixel is associated with color information that is represented by a predetermined number of bits (e.g., 8 bits). Thus, to a machine, a digital image is a collection of color information that specifies what colors should be displayed by a corresponding collection of pixels. Without more, the machine would be unable to discern, from only the bits representing color information, what objects are depicted in the image and where those objects are located within the image.

Machine learning may be used to enable machines to automatically detect and process objects appearing in images. In general, machine learning typically involves processing a training data set in accordance with a machine-learning model and updating the model based on a training algorithm so that it progressively "learns" the features in the data set that are predictive of the desired outputs. The architecture of the machine-learning model, along with how it is trained and what training data is used, determines what the trained model would be capable of doing.

One example of a machine-learning model is a neural network, which is a network of interconnected nodes. Groups of nodes may be arranged in layers. The first layer of the network that takes in input data may be referred to as the input layer, and the last layer that outputs data from the network may be referred to as the output layer. There may be any number of internal hidden layers that map the nodes in the input layer to the nodes in the output layer. In a feed-forward neural network, the outputs of the nodes in each layer—with the exception of the output layer—are configured to feed forward into the nodes in the subsequent layer.

SUMMARY OF PARTICULAR EMBODIMENTS

Embodiments described herein present a flexible and general framework for object instance segmentation using machine learning. A machine-learning model in accordance with particular embodiments may be trained in parallel to process a given image and simultaneously generate (1) object detection (e.g., represented by a bounding box around the object) (2) object classification, and (3) segmentation mask (e.g., a per-pixel mask that identifies the particular pixels that belong to the detected object) for each object instance. Unlike conventional models, embodiments of the machine-learning model described herein decouple class and mask predictions. In doing so, competition between predictions of class and mask is removed during training, thus resulting in improved segmentation performance. Moreover, the framework descried herein is easy to generalize to other tasks, such as estimating poses of humans in images.

To further improve the accuracy of segmentation, the machine-learning model uses a process termed RoIAlign to extract small feature maps from each proposed region of interest (RoI). During training, a region proposal network may generate n number of RoIs, each of which defines a portion of the input image's feature map. RoIAlign may extract a smaller feature map from each RoI, and that extracted feature map may be used for training the classification model, bounding box model, and segmentation model. Conventional methods for extracting smaller feature maps quantizes, by rounding, floating-number RoI to the discrete granularity of the feature map (e.g., effectively "snapping" to the grid of the feature map). While this may not impact classification, which is robust to small translations, it has a significant negative effect on predicting pixel-accurate masks. Thus, RoIAlign removes the quantization so that the extracted features are aligned with the input. This has been shown to improve segmentation accuracy.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 6A and 6B illustrate example training data for training a system for predicting object proposals and object scores.

FIGS. 7A and 7B illustrate example object proposals overlaying images.

FIGS. 11A-11B illustrate an example result of feature extraction with quantization.

DESCRIPTION OF EXAMPLE EMBODIMENTS

Figure 1:
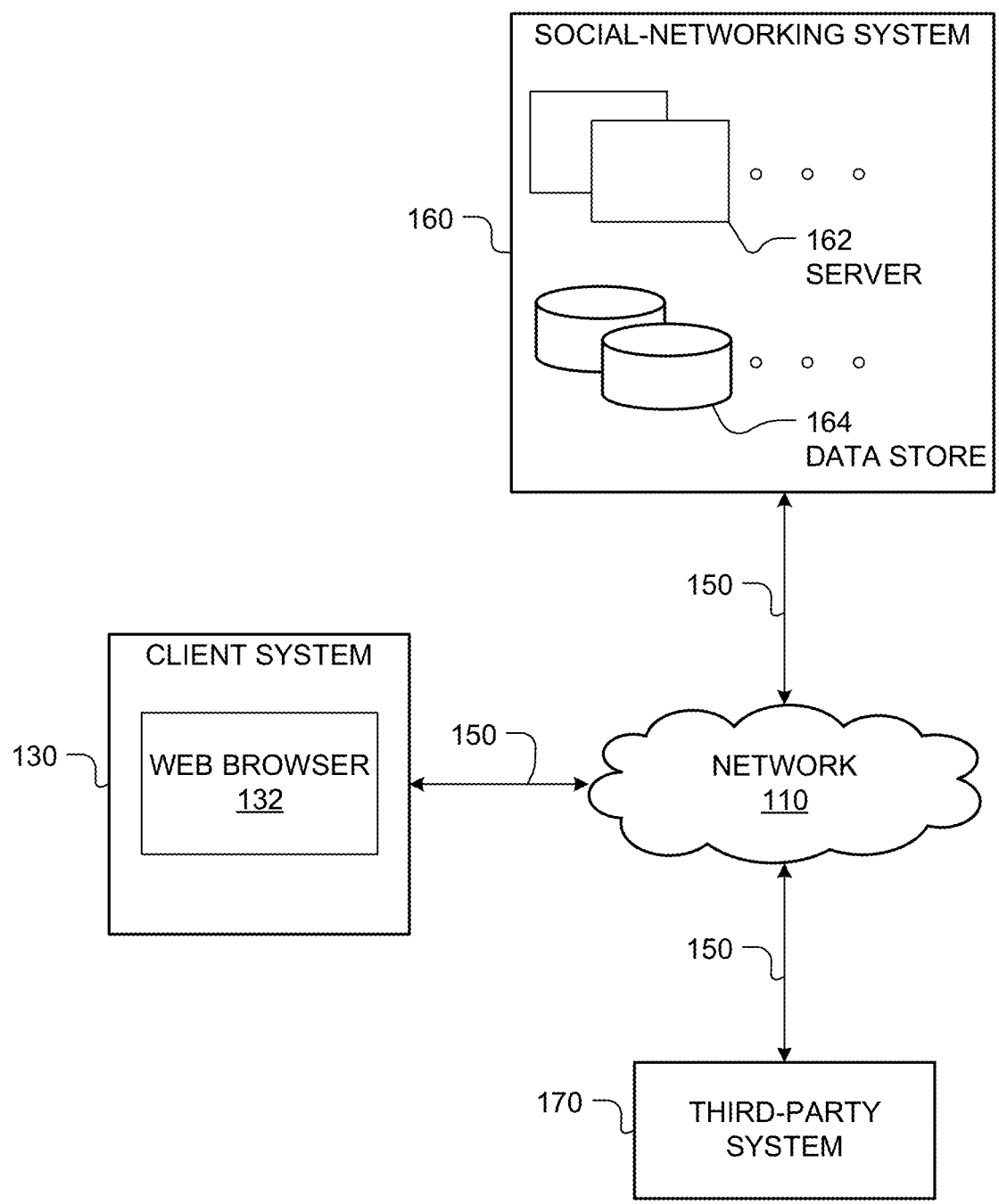
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
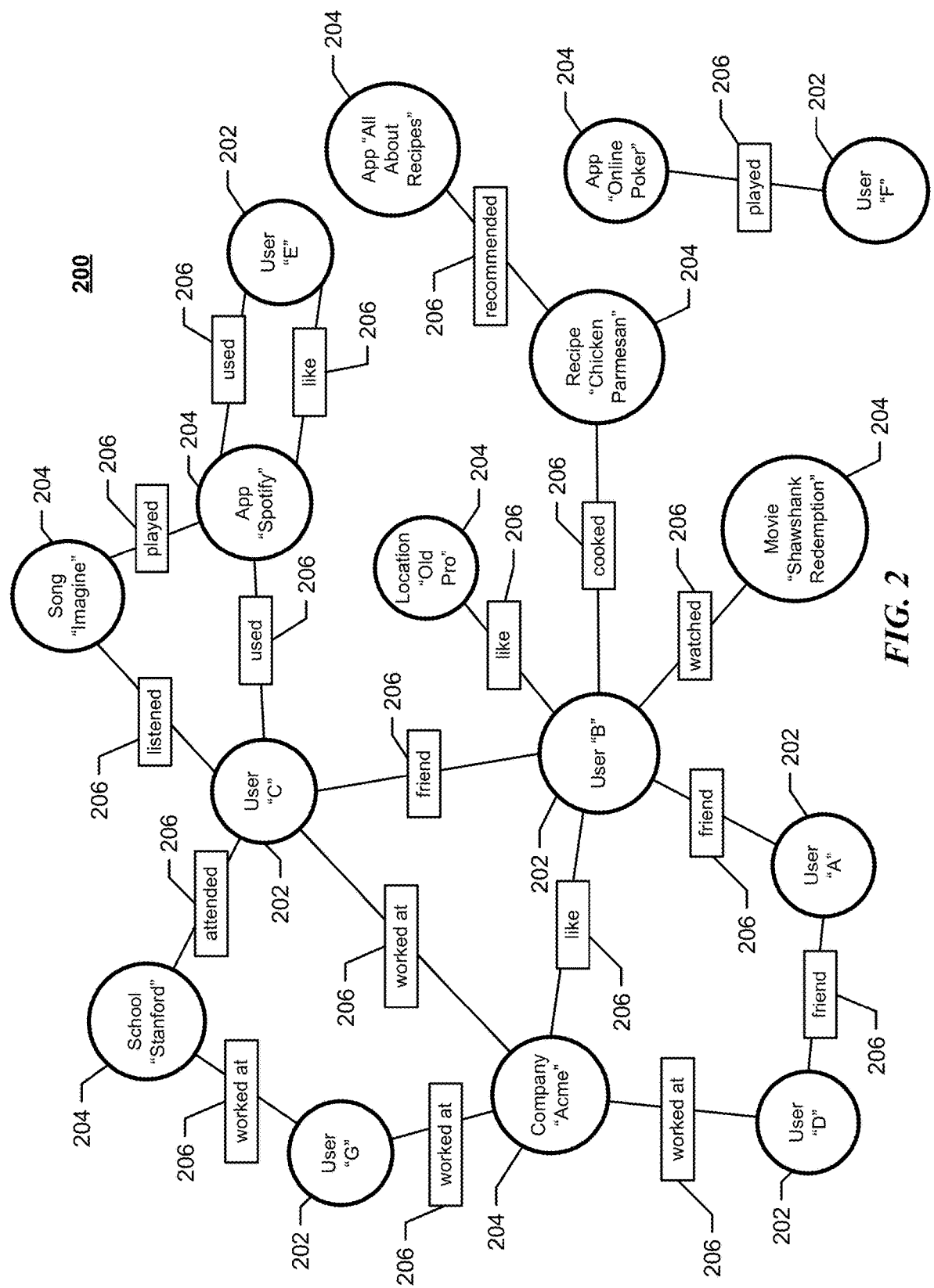
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or quarriable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Generating Object Proposals and Object Scores for Images

In particular embodiments, a computing system may use one or more machine-learning models to generate a number of object proposals corresponding to objects detected within an image. An object proposal may be specified by a mask, for example. Machine-learning models (e.g., convolutional neural networks) may be trained to generate object proposals for patches of an image and to generate object scores representing likelihoods that the corresponding object proposals fully contain objects (e.g., each pixel covered by the patch or mask belong to the object). The object score for each object proposal may be a scalar number. As used herein, a patch of an image may refer to a section or crop of an image (e.g., a collection of pixels). As used herein, an object proposal, which may be represented by a mask, may refer to a map, with grids that correspond to pixels, of numbers that are 0, 1, or unknown (e.g., a number between 0 and 1). In particular embodiments, a value of 0 may indicate that a corresponding pixel is not part of an instance of an object while a 1 may indicate a pixel that is part of the object instance. Objects, as used herein, may refer to any identifiable item in an image. As an example and not by way of limitation, objects may belong to different classifications, include, for example, a person, a chair, a head, a tree, a dog, a dog's collar, a house, a car, a road, or any other suitable item of interest.

In particular embodiments, a machine-learning model may be trained using images that have objects of differing sizes and objects located at differing positions in the image. The machine-learning models may then automatically learn, from the training data, how to identify relevant features/patterns from images in order to identify objects.

In particular embodiments, the machine-learning model may be a convolutional neural network. The convolutional neural network may be a feed-forward network. A feed-forward network (i.e., information flows in one direction through the layers of the network) may provide high-level information regarding positions of objects in an image (e.g., coarse masks/object proposals). In particular embodiments, the machine-learning model may include forward-pass layers (i.e., bottom-up architecture) and backward-pass layers (i.e., top-down architecture). This two-pass convolutional neural network architecture may be used to obtain high-level information and low-level information (e.g., high-resolution masks/object proposals). The two-pass convolutional neural network may be used to obtain high-resolution object proposals. The two-pass convolutional neural network may also be used in pixel labelling tasks.

Object proposals may be used to accomplish any number of suitable tasks. A system may use object-identification algorithms to identify, for an object proposal, what the corresponding object is. As an example and not by way of limitation, an object proposal may provide information regarding the location of an object and may identify the object as being different from proximate objects, and the system may determine, based on the object proposal and using object-identification techniques, that the identified object is an American Pit Bull Terrier.

Figure 3B:
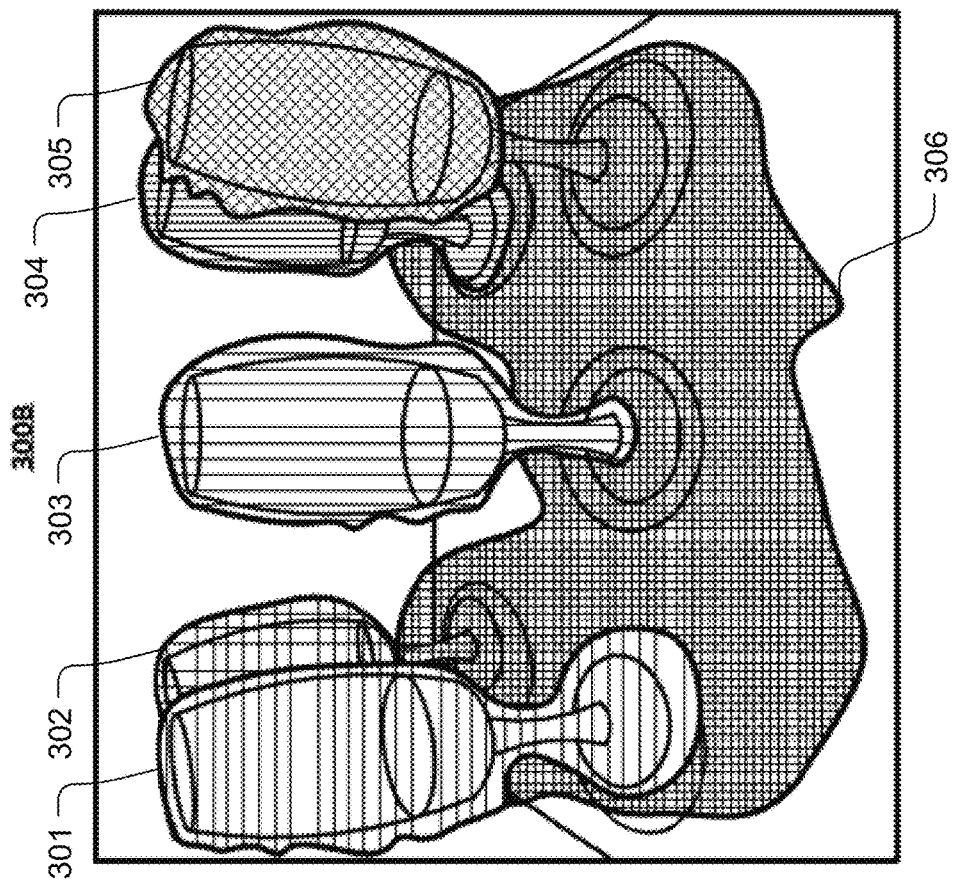
FIG. 3B illustrates an example object proposal overlaying an image.
Figure 3A:
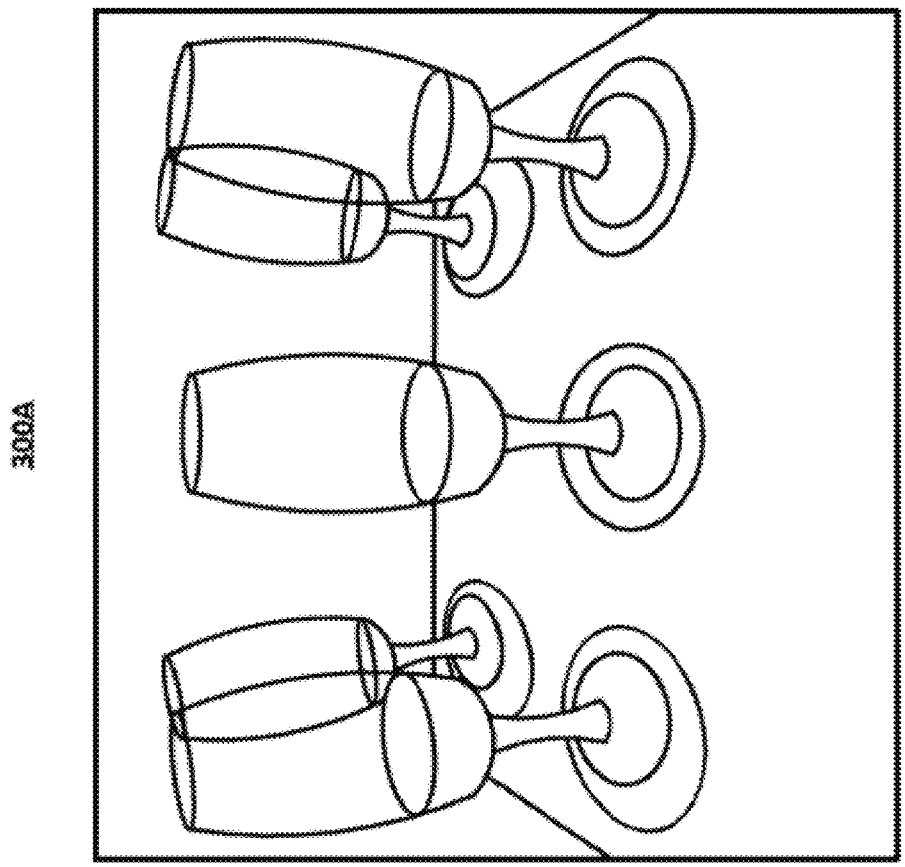
FIG. 3A illustrates an example input image.

FIG. 3A illustrates an example image 300A. Image 300A may be of any suitable size or resolution. The system may process patches of image 300A in order to generate object proposals (e.g., proposals of where instances of objects are located in the image 300A). FIG. 3B illustrates example object proposals overlaying an image. Image 300B in FIG. 3B shows six object proposals 301-306 overlaying image 300A from FIG. 3A. In particular embodiments, a system may determine a plurality of object proposals for an image in order to, for example, identify objects in the image. An object may be any suitable identifiable item in an image (e.g., a person, an animal, an arm, a leg, a cup, etc.). In the example embodiment of FIG. 3B, object proposals 301-306 are represented as shapes overlaying objects in the image 300A. As an example and not by way of limitation, in FIG. 3A, the champagne flutes, which is an object, are shown as having a corresponding overlaying object proposal 301-306. In particular embodiments, the system may determine object proposals using a machine-learning model (e.g., a convolutional neural network). The machine-learning model may employ an algorithm that provides an output of object proposals with recall higher than a predetermined threshold (e.g., the system identifies objects in the forefront, which are differentiated from less important objects in the background), recall higher than a predetermined threshold within a minimum number of regions, and high-quality localization (e.g., accurate identification of locations of objects).

Although this disclosure describes and illustrates particular embodiments of FIGS. 3A and 3B being implemented by a system, this disclosure contemplates any suitable embodiments of FIGS. 3A and 3B as being implemented by any suitable platform or system. As an example, and not by way of limitation, particular embodiments of FIGS. 3A and 3B may be implemented by social-networking system 160, third-party system 170, or any other suitable system. Furthermore, although this disclosure describes and illustrates particular components, devices, or systems carrying out particular steps of the method of FIGS. 3A and 3B, this disclosure contemplates any suitable combination of any suitable components, devices, or systems carrying out any suitable steps of the method of FIGS. 3A and 3B.

Figure 4:
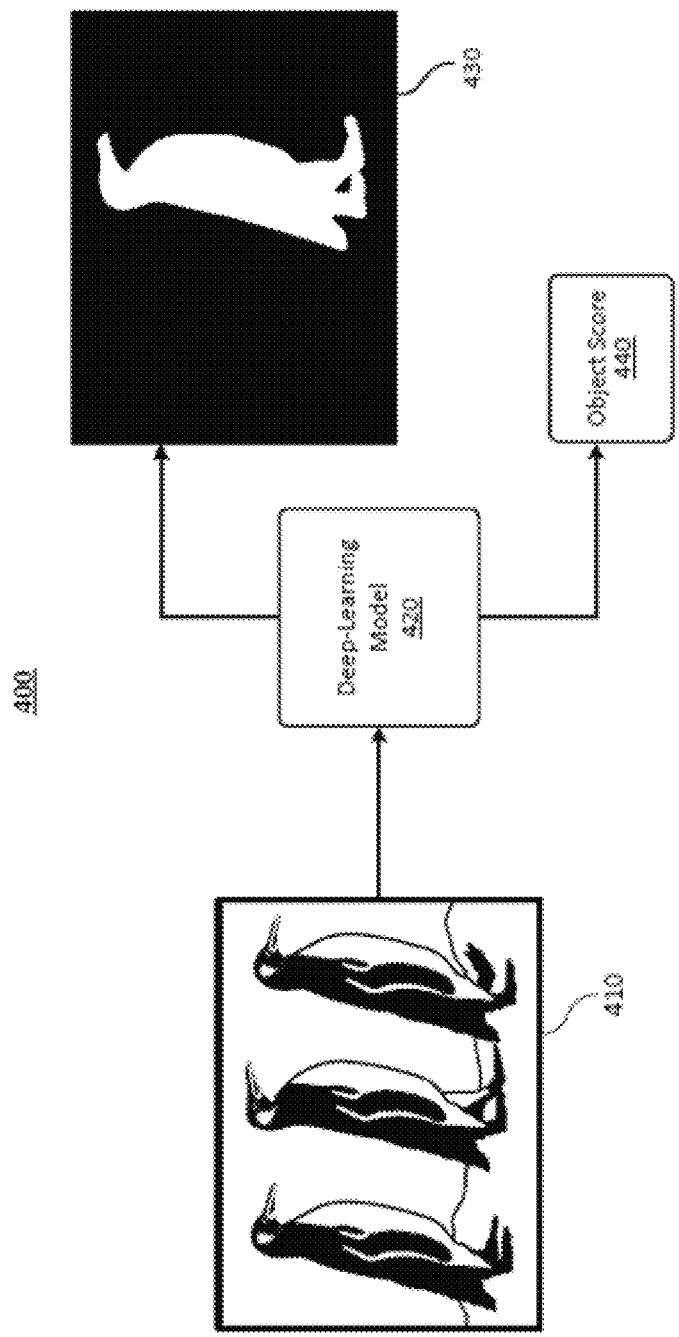
FIG. 4 illustrates an example system for predicting object proposals and object scores.

FIG. 4 illustrates an example system 400 for predicting object proposals 430 and object scores 440. In FIG. 4, the system 400 is depicted as including a machine-learning model 420. As an example and not by way of limitation, machine-learning model 420 may be any suitable number of convolutional neural networks. In particular embodiments, the system may take in a plurality of patches of images 410 as inputs. The system may then output, for each patch input 410, an object proposal 430 (e.g., a binary map that identifies the pixels in the image that correspond to the object) and a score 440 (e.g., a scalar quantity predicting whether there is an object in the patch or not). In the example shown, the object proposal 430 may correspond to the middle penguin shown in image 410. As an example and not by way of limitation, if the patch shows no discernible object (e.g., background section of an image), the object score predicted may be zero. It will be understood that the system is generally described as having one object proposal and one score output for each patch for ease of description, not by way of limitation. In particular embodiments, the system may, for each input patch, output one or more object proposals 430 and one or more corresponding scores 440.

The system may use a fixed-size window to analyze a plurality of overlapping, densely-packed patches of an image. In particular embodiments, the single window may be run over a whole image so that for every portion of the image that overlaps with the window, the machine-learning models may output an object proposal and a score. The system may shift and resize the image to obtain different patches for analysis in the window. As an example and not by way of limitation, the window's dimensions may be a fixed 200×200 pixels, and the patch will always also be of that fixed size for the particular image being analyzed. The image may be any suitable size. The system may shift the image by a fixed amount of pixels every time so that the patches are densely packed and overlapping (e.g., 16-pixel shift). The system may also scale the image (e.g., zoom in or out) by a fixed scale each time (e.g., shrink by 2 times the size of the image). As an example and not by way of limitation, the system may identify a plurality of portions of the 200-pixel image by shifting the 16-pixel window over the image, and process each of the portions using the machine-learning model to obtain object proposals. The system may then shrink the image by a factor of 2, run the 16-pixel shifted windows over the down-sized image to obtain a plurality of portions of the down-sized image, and process the portions using the machine-learning model to obtain additional object proposals for the image. This sliding and scaling window approach ensures that the system is able to generate object proposals for objects at different positions in the image and for objects of different sizes. In particular embodiments, the system may use enough differently-located and sized patches of an image so that for each object in the image, at least one patch is run through the system that fully contains the object (e.g., roughly centered and at the appropriate scale).

Although this disclosure describes and illustrates particular embodiments of FIG. 4 being implemented by a system, this disclosure contemplates any suitable embodiments of FIG. 4 as being implemented by any suitable platform or system. As an example, and not by way of limitation, particular embodiments of FIG. 4 may be implemented by social-networking system 160, third-party system 170, or any other suitable system. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
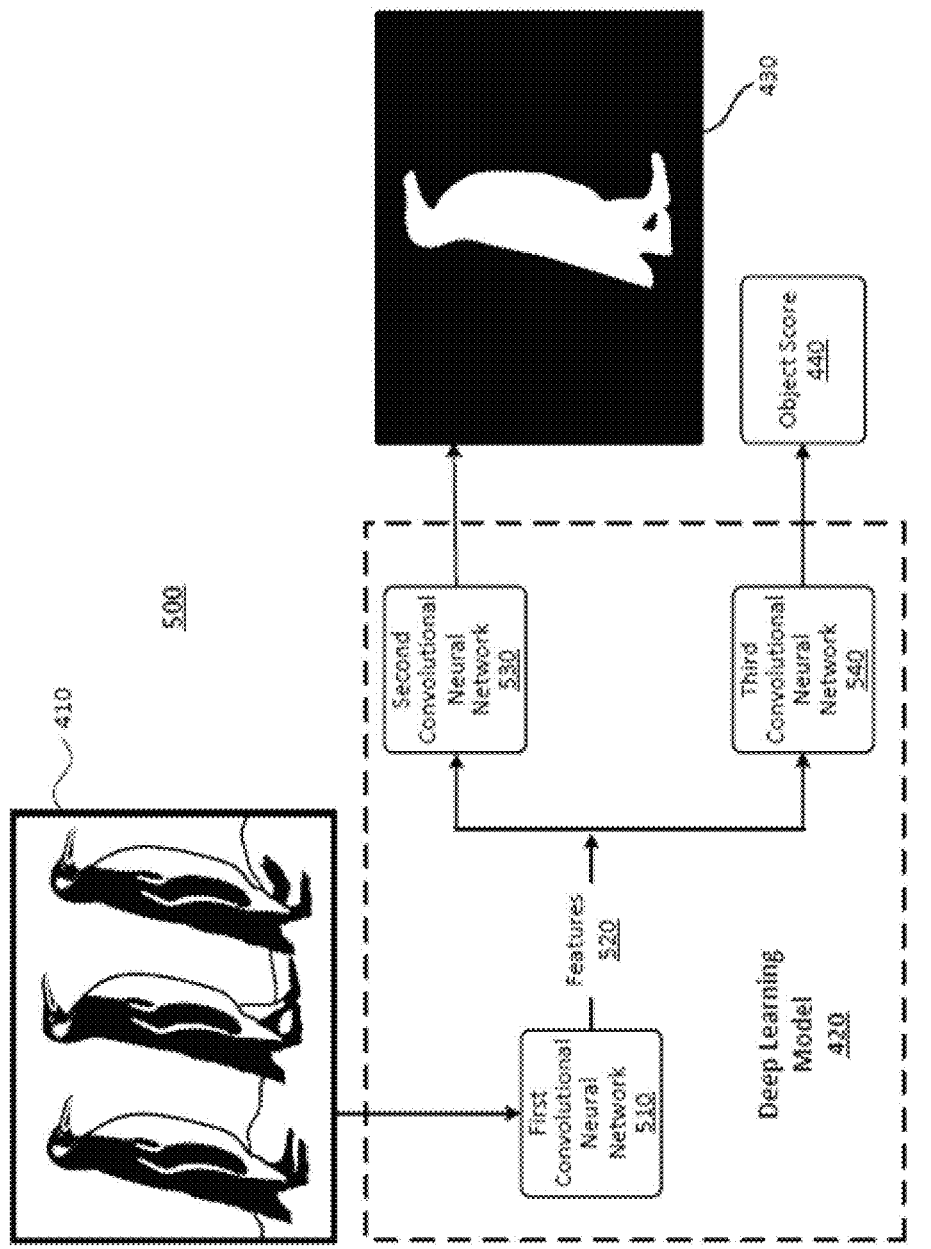
FIG. 5 illustrates an example system for predicting object proposals and object scores.

FIG. 5 illustrates example system 500 for predicting object proposals 430 and object scores 440. System 500 may include one or more machine-learning models 420. For example, the machine-learning models 420. In particular embodiments, one or more of the machine-learning models 420 may be discriminative convolutional networks or convolutional neural networks. In particular embodiments, the system may include three convolutional neural networks—first convolutional neural network 510, second convolutional neural network 530, and third convolutional neural network 540. As shown in the illustrated embodiment of FIG. 5, the system may have a feature-extraction convolutional neural network (e.g., the first convolutional neural network 510) that may take as inputs patches of images 410 and output features 520 of the patch/image. The features 520 may be represented by a feature map that encodes various features of the image 410. In particular embodiments, the feature-extraction network 510 may be pre-trained to perform classification on the image. The feature-extraction model 510 may be fine-tuned for object proposals during training. As an example and not by way of limitation, the feature-extraction network 510 may consist of eight 3×3 convolutional layers and five 2×2 max-pooling layers. As an example and not by way of limitation, the feature-extraction layers may take an input image of dimension 3×h×w, and the output 520 may be a feature map of dimensions 512×h/16×w/16.

In particular embodiments, the system may split into two branches after the shared feature-extraction module (e.g., the first convolutional neural network 510). The output features 520 of the feature-extraction network 510 may be inputted into the illustrated second convolutional neural network 530 and the third convolutional neural network 540. Thus, a large part of the system 500 is shared at the feature-extraction convolutional neural network stage. The layers of the second 530 and third 540 convolutional neural networks may be specialized for separately outputting an object proposal 430 and an object-score prediction 440, respectively. The deep learning system 420 (e.g., the three convolutional neural network models 510, 530, and 540) may be trained by optimizing a cost/loss function that targets both tasks of generating an object proposal and predicting an object score simultaneously. In particular embodiments, the system may be trained using a first training dataset and may be evaluated on two object-detection datasets. As described in further detail below, the second convolutional neural network 530 may be trained to generate an object proposal 430 for a patch of an image, and the third convolutional neural network 540 may be trained to generate a scalar object score 440 (e.g., representing a likelihood or confidence that the patch contains a full object. For each patch inputted into the system, an object proposal and a corresponding object score may be determined.

As described, FIG. 5 illustrates an embodiment of the model 420 with a top branch (i.e., first convolutional neural network 510 and second convolutional neural network 530) and a bottom branch (i.e., first convolutional neural network 510 and third convolutional neural network 540). In particular embodiments, the first convolutional network 510 may be shared by the top and bottom branches of the system in order to save processing power. In particular embodiments, the two branches of machine-learning models may be trained jointly, each branch having a separate objective. The top branch may have the following training objective: given an image patch, the upper branch of the system outputs a class-agnostic segmentation object proposal (in other words, the system attempts to identify an object, without necessarily knowing what the object is). The bottom branch may have the following training objective: given an image patch, the bottom branch of the system outputs an object score that represents the likelihood of the patch being centered on a full object.

In particular embodiments, the top branch of the system 500 (i.e., object-proposal branch) may be dedicated to segmentation (i.e., object-proposal identification) and may be composed of second convolutional neural network 530 that takes as input the features 520 outputted by first convolutional neural network 510. In particular embodiments, the object-proposal branch may include a single 1×1 convolution layer followed by a classification layer (i.e., after the feature extraction layers of first convolutional neural network 510). The classification layer may consist of h×w pixel classifiers (h×w denoting the height and width dimensions), each responsible for indicating whether a given pixel belongs to the object in the center of the patch. Each pixel classifier in the output plane may be able to utilize information contained in the entire feature map, and thus have a complete view of the object. This may allow the system to output an object proposal for a single object even when multiple objects are present (e.g., the multiple champagne flutes shown in FIG. 3B). As an example and not by way of limitation, the system may summarize all of the information for the entire feature map in a single vector that has no spatial dimensions. Every pixel in the object proposal gets a view of the entire image by utilizing the summarized feature vector. In particular embodiments, for the classification layer the system may use locally-connected pixel classifiers. In particular embodiments, for the classification layer the system may use fully-connected pixel classifiers. In particular embodiments, the system decomposes the classification layer into two linear layers with no non-linearity in between (i.e., a low-rank variant of using fully connected linear classifiers). In this embodiment, the number of network parameters may be reduced while allowing each pixel classifier to leverage information from the entire feature map. In particular embodiments, to further reduce model capacity, the output of the classification layer may be set to be $h_0 \times w_0$ with $h_0 < h$ and $w_0 < w$ and the output may be up-sampled to h w to match the input dimensions, where h×w denotes the height and width of the input, and $h_0 \times w_0$ denotes the height and width of the output.

The bottom branch of the system 500 (i.e., object-score branch) may be dedicated to predicting if an object is centered in the patch and at the appropriate scale. The bottom branch may be a convolutional neural network (e.g., third convolutional neural network 540) that takes as input features 520 outputted by first convolutional neural network 510. The bottom branch may be composed of a 2×2 max-pooling layer, followed by two fully-connected layers. The final output of the bottom branch convolutional neural network may be an object score 440 indicating the presence of an object in the center of the input patch (and at the appropriate scale).

It will be understood that the system is described as having multiple component convolutional neural networks for ease of description, not by way of limitation. As an example and not by way of limitation, the entire system illustrated in FIG. 5 may also be termed a single convolutional neural network composed of layers arranged in the described two-branch architecture. In this manner, both object-proposal and object-score predictions may be made with a single convolutional neural network.

Although this disclosure describes and illustrates particular embodiments of FIG. 5 being implemented by a system, this disclosure contemplates any suitable embodiments of FIG. 5 as being implemented by any suitable platform or system. As an example, and not by way of limitation, particular embodiments of FIG. 5 may be implemented by social-networking system 160, third-party system 170, or any other suitable system. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIGS. 6A and 6B illustrate example training data for training a system for predicting object proposals and scores. As described above, the system may be a convolutional neural network that generates object proposals and a score for each object proposal. As an example and not by way of limitation, the two tasks may share a plurality of layers of the network (e.g., feature-extraction layers), and the remaining layers may be task-specific layers. In particular embodiments, the convolutional neural network may be jointly trained, which may result in reduced model capacity and increased speed in determining the object proposals and scores.

The training set may include a number of samples k. In particular embodiments, each sample k may be a triplet containing (1) an RGB input patch $x_k$, (2) the binary object proposal corresponding to the input patch $m_k$ (with $k_m^{ij} \in \{\pm 1\}$, where (i,j) corresponds to a pixel location on the input patch), and (3) a label $y_k \in \{\pm 1\}$, which specifies whether the patch contains an object. Specifically, a patch $x_k$ may be given label $y_k \in \{1\}$ if it satisfies the following constraints: (i) the patch contains an object roughly centered in the input patch, and (ii) the object is fully contained in the patch and in a given scale range. A patch $x_k$ may be given label $y_k = -1$ even if an object is partially present. Assuming $y_k = 1$, the object proposal $m_k$ may have positive values only for the pixels that are part of the single object located in the center of the patch. If $y_k = -1$ the object proposal may not be used. FIGS. 6A and 6B show examples of triplets that may be in the training set for training the convolutional neural network. In FIGS. 6A and 6B, patches 600A and 600B are training input patches, and object proposals 610A and 610B are binary object proposals corresponding respectively to patches 600A and 600B. The labels for the training samples are not shown in FIGS. 6A and 6B. In both FIGS. 6A and 6B, patches 600A and 600B contain an object roughly centered in the input path, and the object is fully contained in the patch and in a given scale range, so the labels may be $y_k = 1$ for both.

In particular embodiments, the convolutional neural network may be jointly trained using the following method: Given an input patch $x_k \in I$, I denoting the set of image patches, the convolutional neural network may be trained to jointly infer a pixel-wise object proposal (e.g., segmentation mask) and an object score. In particular embodiments, the loss function for training the convolutional neural network may be sum of binary logistic regression losses, one for each location of the convolutional neural network and one for the object score, over all training triplets $(x_k, m_k, y_k)$, given by eq. (1):

$$\mathcal{L}(\theta) = \sum_k \left( \frac{1+y_k}{2w^\alpha h^\alpha} \sum_{ij} \log\left(1 + e^{-m_k^{ij} f_{segm}^{ij}(x_k)}\right) + \lambda \log(1 + e^{-y_k f_{score}(x_k)}) \right) \quad (1)$$

As used herein, $\theta$ denotes the set of parameters, $f_{segm}^{ij}(x_k)$ denotes the prediction of the convolutional neural network at location (i,j), and $f_{score}(x_k)$ denotes the predicted object score. The system may be trained by alternating between the object-proposal branch (e.g., the top-branch convolutional neural network in FIG. 5) and the object-score branch (e.g., the bottom-branch convolutional neural network in FIG. 5). As an example and not by way of limitation, the training may be accomplished by back-propagating and setting $\lambda = 1/32$. In particular embodiments, for the object-score branch, training data may be sampled so that the object-score branch (e.g., the top-branch convolutional neural network in FIG. 5) is trained with an equal number of positive samples (e.g., patches of images with fully-contained objects) and negative samples (e.g., patches of images with partial or no objects). In particular embodiments, for the object-proposal branch, training data may be sampled so that the object-proposal branch (e.g., the top-branch convolutional neural network in FIG. 5) is trained with only positive samples (e.g., patches of images with full-contained objects).

Although this disclosure describes and illustrates particular embodiments of FIGS. 6A and 6B being implemented by a system, this disclosure contemplates any suitable embodiments of FIGS. 6A and 6B as being implemented by any suitable platform or system. As an example, and not by way of limitation, particular embodiments of FIGS. 6A and 6B may be implemented by social-networking system 160, third-party system 170, or any other suitable system. Furthermore, although this disclosure describes and illustrates particular components, devices, or systems carrying out particular steps of the method of FIGS. 6A and 6B, this disclosure contemplates any suitable combination of any suitable components, devices, or systems carrying out any suitable steps of the method of FIGS. 6A and 6B.

FIGS. 7A and 7B illustrate example object proposals overlaying images 700A and 700B. FIG. 7A depicts an image with a plurality of overlapping object proposals. In particular embodiments, the object proposals may be ranked using the respective object scores determined for each. In other words, the system may determine ranks for the object proposals based on which object proposals have the highest scores and thus the highest likelihoods of fully containing objects. In particular embodiments, the system may keep a predetermined number or percentage of high-ranked object proposals, the top-ranked object proposal, or any other suitable number of object proposals based on the rankings. The system may throw away the rest of the lower-ranked object proposals. FIG. 7B depicts the same image as that in FIG. 7A, but FIG. 7A depicts only the top-ranked object proposals. In particular objects, the number and quality of object proposals that are kept may be determined based on a particular application or algorithm into which the object proposals may be fed as input. As an example and not by way of limitation, the system may use object-identification techniques to determine what the objects in the object proposals are (e.g., that the shapes in FIG. 7A are an American Pit Bull Terrier and people walking in the background), and the object-identification techniques may have particular benchmarks for quality and quantity of object-proposals 430 to be used. As another example and not by way of limitation, one or more of the object proposals (e.g., object proposals 430 having object scores 440 higher than a predetermined threshold) may be used to accomplish various tasks including depth estimation (e.g., for every pixel, assign a depth value), optical-flow motion estimation (e.g., for every pixel, predict where that pixel is moving), pose estimation (e.g., of a human-body pose), object movement and tracking, or any other suitable task that may determine information based on object proposals.

Although this disclosure describes and illustrates particular embodiments of FIGS. 7A and 7B being implemented by a system, this disclosure contemplates any suitable embodiments of FIGS. 7A and 7B as being implemented by any suitable platform or system. As an example, and not by way of limitation, particular embodiments of FIGS. 7A and 7B may be implemented by social-networking system 160, third-party system 170, or any other suitable system. Furthermore, although this disclosure describes and illustrates particular components, devices, or systems carrying out particular steps of the method of FIGS. 7A and 7B, this disclosure contemplates any suitable combination of any suitable components, devices, or systems carrying out any suitable steps of the method of FIGS. 7A and 7B.

Refining Object Proposals

Figure 8:
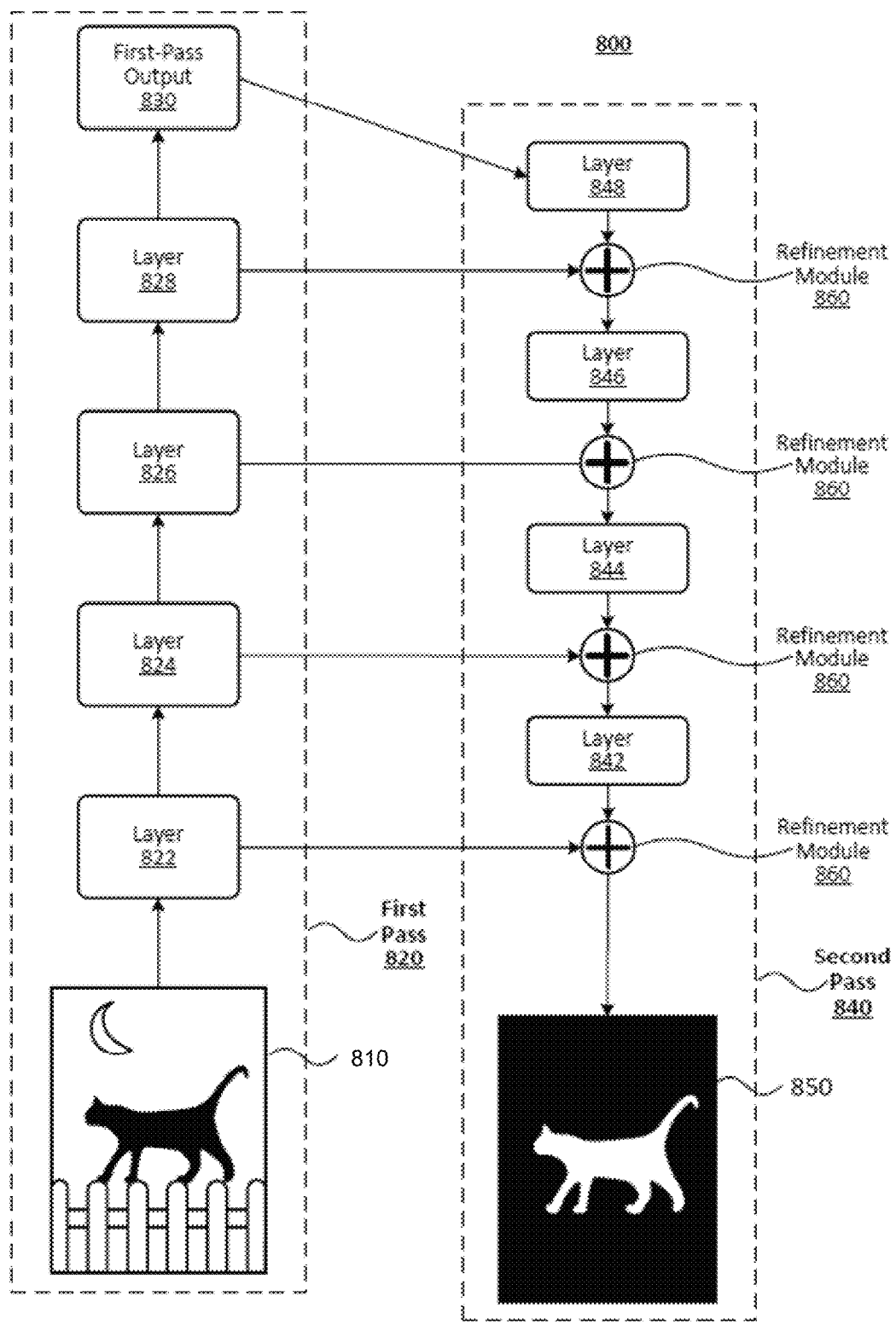
FIG. 8 illustrates an example system for determining object proposals and object scores.

FIG. 8 depicts a system 800 for generating refined object proposals 850. In particular embodiments, system 800 may generate high-resolution, semantically-meaningful features of an image using a bottom-up/top-down architecture. System 800 may be a feed-forward network that includes a first pass 820 and a second pass 840. First pass 820 may include layers 822, 824, 826, and 828 and first-pass output 830. Second pass 840 may include layers 842, 844, 846, and 848. First pass 820 may take as input image patches 810. As an example and not by way of limitation, as the information is processed and signals are sent to each deeper layer in first pass 820, spatial resolution is lost and more semantically-meaningful information is gained. In other words, the height and width of each layer decreases but the number of feature planes increases. Initially, as information is processed at the bottom of first pass 820 of system 800, the output of the layers (e.g., layer 822) is low-level, basic information about the image (e.g., edges, blobs, etc.). As information is passed to and processed by the top layers (e.g., layer 828), the output of the layers is high-level, semantically-meaningful information (e.g., identification of the location of an object and that it is different from other similar objects). First-pass output 830 may include object-level information. As an example and not by way of limitation, first-pass output 830 may be a semantically-meaningful feature map with multiple channels. As an example and not by way of limitation, first-pass output 830 may include object-proposal encodings (i.e., object proposals 430). The second pass 840 of system 800 is then used in order to extract pixel-level information (i.e., high-resolution information) for image patches 810 in addition to the object-level information obtained in first pass 820.

Second pass 840 of system 800 may include layers 842, 844, 846, and 848. Each of layers 842, 844, 846, and 848 may include the same processing components and/or algorithms as a corresponding layer in first pass 820. As an example and not by way of limitation, layer 842 may be the same as layer 822; layer 844 may be the same as layer 824; layer 846 may be the same as layer 826; and layer 848 may be the same as layer 828. Although layers 842, 844, 846, and 848 may be the same as layers 822, 824, 826, and 828, respectively, the inputs and outputs of each layer in the second pass 840 will be different than the inputs and outputs of each layer in the first pass 820. Although first pass 820 and second pass 840 are depicted as having a particular number of layers in FIG. 8, it will be understood that this is for clarity and ease of description and not by way of limitation. First pass 820 may include any suitable number of layers, and second pass 840 will include the same number of layers as first pass 820, because each layer in second pass 840 is the same as a layer in first pass 820. Layer 848 may take as input the output 830 of the first pass. After an input image patch is processed by first pass 820 and second pass 840, system 800 will have generated object-level information (e.g., general identification of a cat in an image) and the pixel-level information (e.g., identification of the edges of the cat).

In particular embodiments, system 800 refines it by successively integrating information from earlier layers. Specifically, we introduce a refinement module and stack successive such modules together into a top-down refinement process. On first pass 820, system 800 processes input image patch 810 through layers 822, 824, 826, and 828 to generate first-pass output 830 (i.e., object-proposal encoding). Second pass 840 processes first-pass output 830 through layers 848, 846, 844, and 842 in a top-down architecture. The input of each layer in second pass 840 is the output of the immediately-preceding layer in second pass 840 (i.e. object-proposal encodings) combined with the output from a corresponding layer on first pass 820 (i.e., features). In particular embodiments, second pass 840 successively integrates information from earlier layers. Thus, system 800 takes advantage of high-resolution features from first pass 820 in the layers of second pass 840. The output of system 800, refined object proposal 850, may include features that include object-level information and pixel-level information. As an example, the object proposal 850 output from the two-pass system 800 will be more precise at a pixel level than the object-proposal encodings in first-pass output 830. As another example and not by way of limitation, refined object proposal 850 may have a resolution that is the same as the resolution of the input image patch 810. Refined object proposal 850 may be a pixel labeling of the same resolution as the input image patch 810.

In particular embodiments, features output from layers in the first pass 820 may be combined with object-proposal encodings outputted by layers in second pass 840 using refinement modules 860. Each refinement module 860 may invert the effects of pooling in first pass 820 in order to double the resolution of the input object-proposal encoding (i.e., output from the immediately preceding layer in second pass 840). Each refinement module 860 may be denoted by $R^i$, and each refinement module $R^i$ takes as input an object-proposal encoding $M^i$ generated in the top-down second pass 840 and matching features $F^i$ generated in bottom-up first pass 820. Each refinement module $R^i$ may be trained to merge the object-proposal encoding and the matching features in order to generate a new upsampled object encoding $M^{i+1}$. Thus, $M^{i+1}=R^i(M^i,F^i)$. In particular embodiments, multiple refinement modules 860 are stacked in second pass 840. As an example and not by way of limitation, there may be one refinement module 860 for each layer in the first pass 820 (i.e., every pooling layer).

Although this disclosure describes and illustrates particular embodiments of FIG. 8 being implemented by a system, this disclosure contemplates any suitable embodiments of FIG. 8 as being implemented by any suitable platform or system. As an example, and not by way of limitation, particular embodiments of FIG. 8 may be implemented by social-networking system 160, third-party system 170, or any other suitable system. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Mask R-CNN

Particular embodiments described herein relate to machine-learning models and various optimization techniques that enable computing systems to perform tasks related to computer vision. For example, according to particular embodiments, a machine-learning model may be trained to detect object instances depicted in an image, classify the detected object instances, and/or segment the object instances from the image. As an example, using the trained model, a computing system may process an image's pixel information and detect an area (e.g., specified by a bounding box) in the image that contains an object instance, classify or label the object instance (e.g., a person, car, building, etc.), and/or identify particular pixels that correspond to the object instance.

The vision community has rapidly improved object detection and semantic segmentation results over a short period of time. In large part, these advances have been driven by powerful baseline systems, such as Fast/Faster R-CNN and Fully Convolutional Network (FCN) frameworks for object detection (e.g., detection of objects via bounding boxes without necessarily knowing their classes/types) and semantic segmentation (e.g., per-pixel classification without differentiating object instances), respectively. These methods are conceptually intuitive and offer flexibility and robustness, together with fast training and inference time. Particular embodiments provide a comparably enabling framework for instance segmentation.

Instance segmentation is challenging because it requires the correct detection of objects in an image while also precisely segmenting each instance. It, therefore, combines elements from the classical computer vision tasks of object detection, where the goal is to classify individual objects and localize each using a bounding box, and semantic segmentation, where the goal is to classify each pixel into a fixed set of categories without differentiating object instances. As used herein, "object detection" is used to denote detection via bounding boxes, not masks, and "semantic segmentation" is used to denote per-pixel classification without differentiating instances. As described herein, "instance segmentation" is both semantic and a form of detection. Given this, one might expect a complex method is required to achieve good results. However, particular embodiments may show that a surprisingly simple, flexible, and fast system can surpass prior state-of-the-art instance segmentation results.

Figure 9:
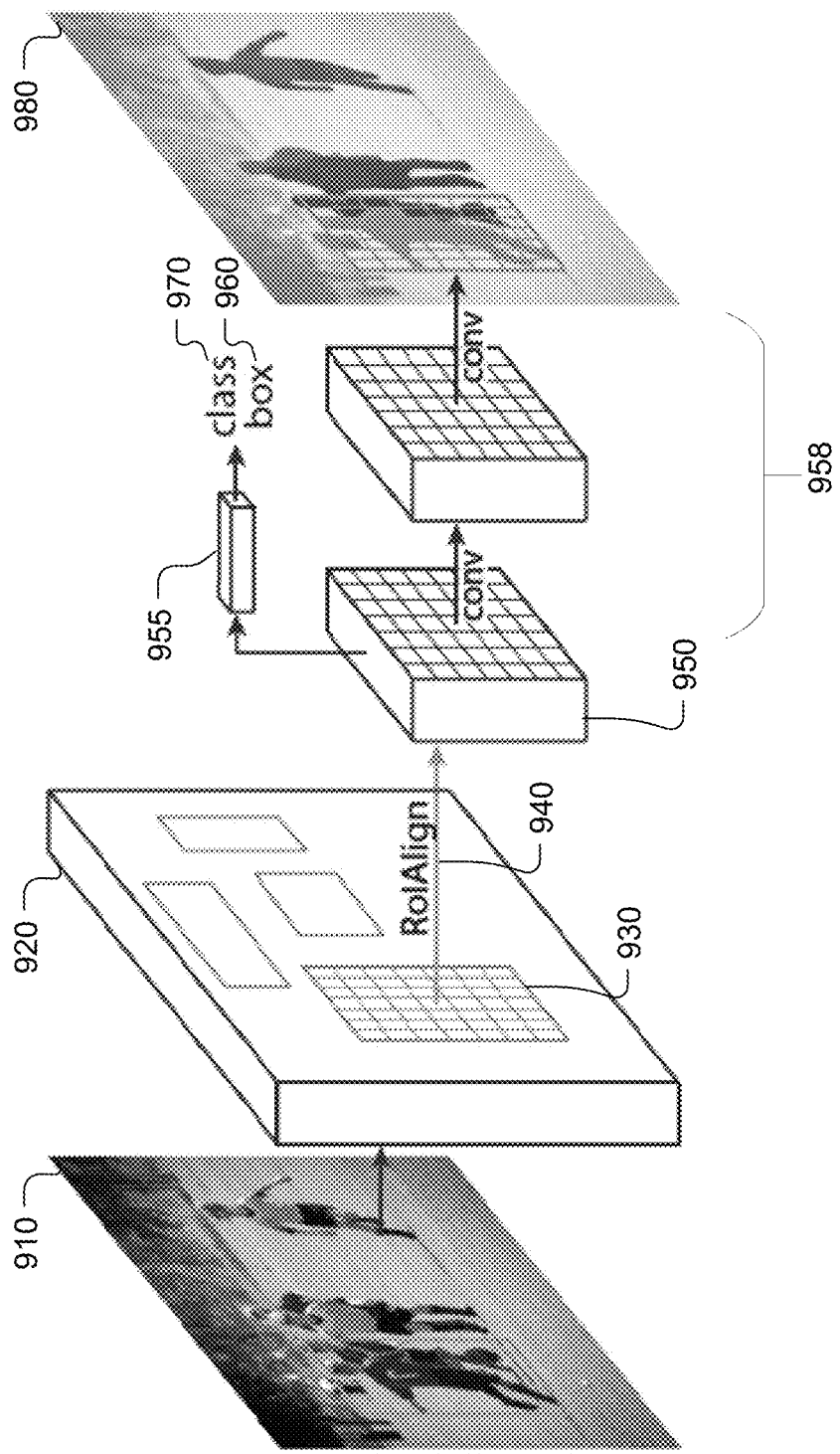
FIG. 9 illustrates an example framework for instance classification, detection, and segmentation.

Particular embodiments of the techniques described herein ("Mask R-CNN"), extend Faster R-CNN by adding a branch for predicting segmentation masks on each Region of Interest ("RoI"), in parallel with the branch for classification and bounding box regression. FIG. 9 illustrates an example embodiment of the Mask R-CNN framework. The figure shows an example input image 910, which shows several humans playing soccer. A deep network, such as ResNet, Feature Pyramid Network (FPN), or any other suitable convolutional backbone, may process the input image 910 and generate a feature map 920. In particular embodiments, the output of the backbone may also be used by a region proposal network (RPN) to identify any number of RoIs (e.g., 930) that map to regions in the feature map 920. An individual RoI, such as RoI 930, may then be processed using a process termed RoIAlign 940 (to be described in further detail) to extract a smaller RoI or regional feature map 950 (e.g., 7×7). The smaller regional feature map may have a fixed, predetermined size (e.g., n×n or n×m). The RoI feature map 950 may then be used by different branches in parallel to (1) detect an object 960 (via the use of a bounding box), (2) classify the object 970 (e.g., as a person, dog, etc.), (3) segment the object 980 (e.g., via a segmentation mask). In particular embodiments, each of these three tasks may be performed using one or more neural network layers, such as convolutional neural networks. For example, fully connected layers 955 may be used for object detection 960 and object classification 970. In particular embodiments, the network 958 for the segmentation mask branch may be a fully convolutional network (FCN) applied to each RoI, predicting a segmentation mask in a pixel-to-pixel manner. The mask branch only adds a small computational overhead, enabling a fast system and rapid experimentation. As further described below, the architecture of Mask R-CNN enables the three branches to be trained and used simultaneously.

Figure 10:
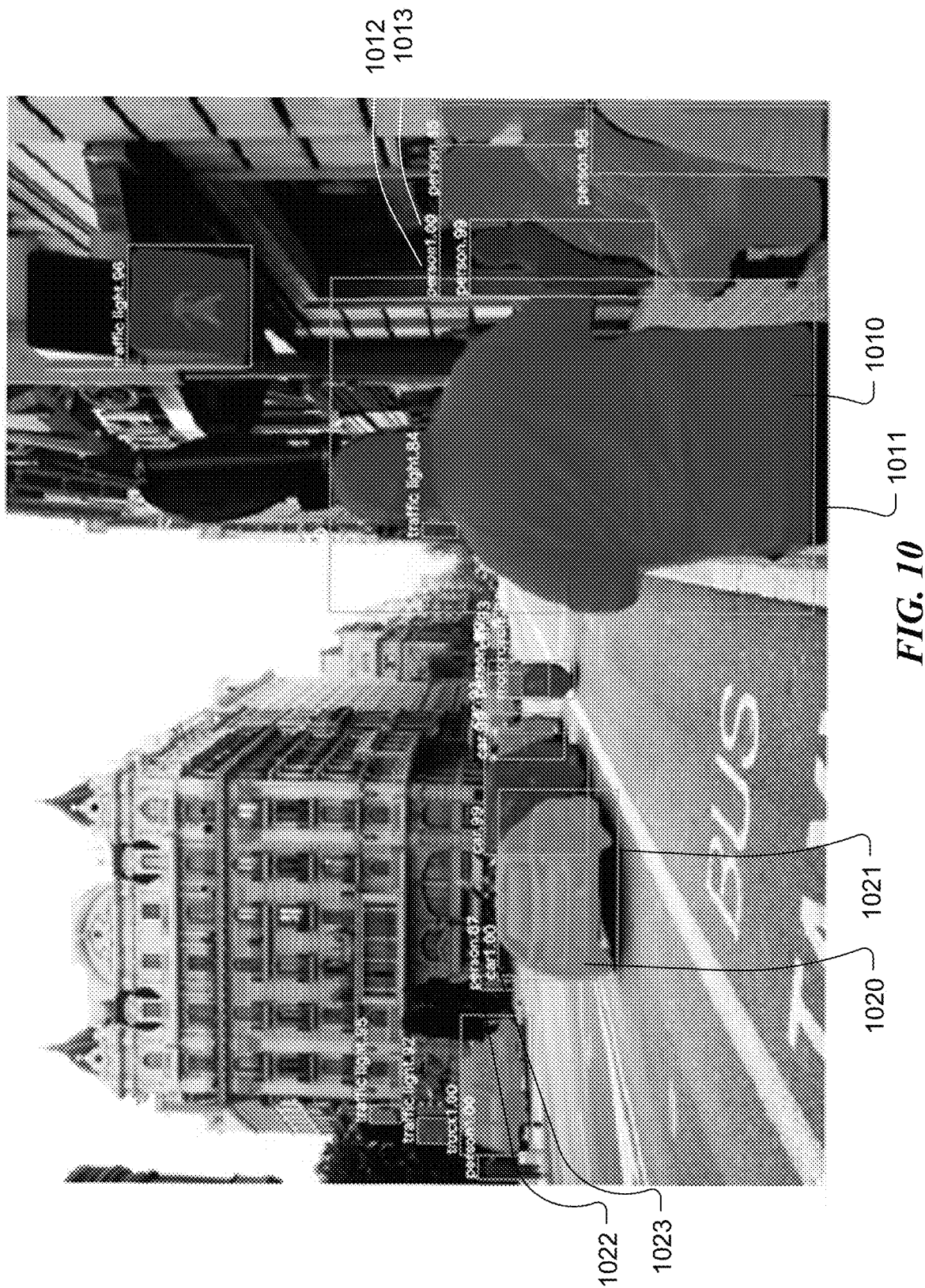
FIG. 10 illustrate example segmented images with masks.

FIG. 10 illustrates an example result of performing image processing using Mask R-CNN on the Common Objects in Context (COCO) test set (which contains various images of particular objects). FIG. 10 may alternatively represent a training image with ground-truth labels for classification (e.g., labels of "car" or "person"), bounding-box object detection (e.g., the bounding boxes around objects, such as cars), and instance segmentation (e.g., the masks, represented in different colors, identifying particular pixels corresponding to each object instance). Models for particular embodiments may run at about 200 ms per frame on a GPU, and training on COCO may take one to two days on a single 8-GPU machine. Masks for object instances are shown in color, such as the blue mask 1010 for a person instance and the yellow mask 1020 for a car instance. FIG. 10 also show bounding boxes for detected instances, such as the rectangular bounding boxes 1011 and 1021 around the aforementioned person instance and car instance, respectively. The image also shows the classification categories that the system determined for the detected instances. For example, the system classified the aforementioned person instance as a "person" 1012 and the car instance as a "car" 1022. FIG. 10 also show the confidences of the predictions. For example, predictions for both the aforementioned person instance and the car instance received 1.00 confidence scores 1013 and 1023, respectively. In addition to excelling at instance segmentation tasks, object detection tasks, and object classification tasks, particular embodiments may also excel at the task of human pose estimation. By viewing each keypoint as a one-hot binary mask, with minimal modification Mask R-CNN may be applied to detect instance-specific poses. Mask R-CNN, therefore, can be seen more broadly as a flexible framework for instance-level recognition and can be readily extended to more complex tasks.

In particular embodiments, Mask R-CNN may be implemented as an extension of Faster R-CNN. Faster R-CNN is based on the R-CNN (Region-based CNN) approach to bounding-box object detection, which is to attend to a manageable number of candidate object regions and evaluate convolutional networks independently on each RoI. R-CNN was extended to allow attending to RoIs on feature maps using RoIPool, leading to fast speed and better accuracy. Faster R-CNN advanced this stream by learning the attention mechanism with a Region Proposal Network (RPN). Earlier methods for addressing instance segmentation are based on segment proposals and resorted to bottom-up segments. For example, earlier methods learn to propose segment candidates, which are then classified by Fast R-CNN. In these methods, segmentation precedes recognition, which is slow and less accurate. Likewise, other methods use a complex multiple-stage cascade that predicts segment proposals from bounding-box proposals, followed by classification. In contrast to these prior methods, Mask R-CNN is based on parallel prediction of masks and class labels, which is simpler, more flexible, and shown to provide improved results due to the decoupling of the tasks.

Particular embodiments of Mask R-CNN, described in further detail below, modify the Faster R-CNN framework to ensure good, accurate results. For example, Faster R-CNN was not designed for pixel-to-pixel alignment between network inputs and outputs. This is most evident in how RoIPool, the de facto core operation for attending to instances, performs coarse spatial quantization for feature extraction. To fix the misalignment, particular embodiments provide a simple, quantization-free layer, referred to as RoIAlign herein, that faithfully preserves exact spatial locations. Despite being a seemingly minor change, RoIAlign has a large impact: it improves mask accuracy by relative 10% to 50%, showing bigger gains under stricter localization metrics. As another example of Mask R-CNN's improvements over prior systems, particular embodiments decouple mask and class prediction to significantly improve the results of both tasks. Specifically, particular embodiments predict a binary mask for each class independently, without competition among classes, and uses the network's RoI classification branch to predict the category. In contrast, FCNs usually perform per-pixel multi-class categorization, which couples segmentation and classification, and based on experiments works poorly for instance segmentation.

As previously mentioned, particular embodiments of Mask R-CNN extend Faster R-CNN. Faster R-CNN consists of two stages. The first stage, called a Region Proposal Network (RPN), proposes candidate object bounding boxes. The second stage, which is in essence Fast R-CNN, extracts features using RoIPool from each candidate box and performs classification and bounding-box regression. The features used by both stages can be shared for faster inference. Faster R-CNN has two outputs for each candidate object: a class label and a bounding-box location (e.g., as identified by an offset).

Particular embodiments of Mask R-CNN extend Faster R-CNN by adding a third branch that predicts and outputs an object mask for each object instance. Embodiments of the mask branch may use different types of neural networks, such as FCN and multi-layer perceptrons (MLP). The additional mask output is distinct from the class and box outputs, requiring extraction of much finer spatial layout of an object. Thus, in general, particular embodiments of Mask R-CNN has a two-stage procedure. In the first stage, an RPN is used to propose candidate RoIs based on a feature map of the input image. In the second stage, in parallel to predicting the class and box offset, Mask R-CNN also outputs a binary mask for each RoI. Mask R-CNN, in contrast to other systems where classification depends on mask predictions, applies classification, object detection, and instance segmentation tasks in parallel, thereby largely simplifying the multi-stage pipeline of original R-CNN.

In particular embodiments, during training, each sample image in the training dataset may be processed by a neural network (e.g., ResNet 50 or any other suitable network) to generate a feature map. An RPN may then be used to generate any number of proposed RoI candidates. Each RoI candidate, which may have ground-truth labels of the correct classification, detection, and/or segmentation information, may then be used to train the three task branches for predicting per-RoI object classifications, detections, and segmentations.

Formally, during training, particular embodiments may define a multi-task loss on each sampled RoI as $L = L_{cls} + L_{box} + L_{mask}$. In particular embodiments, the classification loss $L_{cls}$ may be computed based on a comparison of the predicted class and the ground-truth class for that RoI. In particular embodiments, the bounding-box loss $L_{box}$ may also be based on a comparison of the predicted bounding box and the ground-truth bounding box for that RoI. In particular embodiments, the bounding-box loss $L_{box}$ may be derived based on regression. In particular embodiments, the classification loss $L_{cls}$ and bounding-box loss $L_{box}$ may be identical. In particular embodiments, the mask branch may have a $Km^2$-dimensional output for each RoI, which encodes K binary masks (one for each of the K classes) of resolution m×m each. Particular embodiments may apply a per-pixel sigmoid to the output of the mask branch, and define $L_{mask}$ as the average binary cross-entropy loss. In particular embodiments, for an RoI associated with ground-truth class k, $L_{mask}$ may only be defined for the mask that corresponds to class k (e.g., if the order of the generated masks corresponds to the order of the classes, $L_{mask}$ may be defined only for the k-th mask); other mask outputs do not contribute to the loss.

The definition of $L_{mask}$ in accordance with particular embodiments allows the network to generate masks for every class (e.g., the $Km^2$-dimensional output) without competition among classes. This is because when the system generates the K masks, it does so without regard to which class is correct. Particular embodiments may rely on the dedicated classification branch to predict the class label used to select the output mask. As a result, mask prediction and class prediction are decoupled in embodiments of Mask R-CNN. This is different from common practices that apply FCNs to semantic segmentation, which typically uses a per-pixel softmax and a multinomial cross-entropy loss. This results in competition between masks across classes, thereby negatively affecting the accuracy of the mask predictions. In contrast, by using a per-pixel sigmoid and a binary loss to compute mask loss $L_{mask}$ in accordance with particular embodiments, masks do not compete across classes. It has been observed, based on experimentations, that this formulation is responsible for improved instance segmentation results.

Particular embodiments of a mask representation will now be described. In particular embodiments, a mask encodes an input object's spatial layout. Thus, unlike class labels or box offsets that are collapsed into short output vectors by fully connected (fc) layers, extracting the spatial structure of masks can be addressed naturally by the pixel-to-pixel correspondence provided by convolutions. Particular embodiments may predict an m×m mask from each RoI using an FCN. This may allow each layer in the mask branch to maintain the explicit m×m object spatial layout without collapsing it into a vector representation that lacks spatial dimensions. Unlike previous methods that resort to fc layers for mask prediction, particular embodiments may require fewer parameters, and may be more accurate.

In particular embodiments, the pixel-to-pixel correspondence in mask generation may benefit from RoI features (which themselves are small feature maps) to be well aligned with the image's feature map to faithfully preserve the explicit per-pixel spatial correspondence. To address this, particular embodiments provide an RoIAlign layer that has been shown to significantly improve the accuracy of mask prediction.

Conventionally, RoIPool is a standard operation for extracting a small feature map (e.g., 7×7) from each RoI. RoIPool first quantizes a floating-number RoI to the discrete granularity of the feature map, this quantized RoI is then subdivided into spatial bins which are themselves quantized, and finally feature values covered by each bin are aggregated (usually by max pooling). Quantization may be performed, for example, on a continuous coordinate x by computing [x/16], where 16 is a feature map stride (or any other stride, such as 4, 8, 32, etc.) and [.] is rounding; likewise, quantization is performed when dividing the RoI into bins (e.g., 7×7). For example, if the x edge of an RoI is at 32, performing quantization with a feature map with stride 16 would result in [32/16]=2, which represents the edge being "snapped" to the closest grid coordinate as defined by the stride size. Since rounding is being performed, any value of x in the range of 33 to 39, for example, would result in the edge being snapped to grid 2. A similar operation may be performed alternatively or additionally in they coordinate (e.g., [y/16]). These quantizations introduce misalignments between the RoI and the extracted features.

To illustrate, FIGS. 11A-B show a simplified result of quantization when performing RoI feature extraction. FIG. 11A illustrates an RoI 1110, as proposed by the RPN, overlaid over a feature map 1100, which is represented as a dashed grid (as determined by the feature map's stride). The size of the grids may be based on the stride of the feature map 1100. When extracting features from the RoI 1110, conventional systems perform quantization, which effectively "snaps" the region from which features are extracted onto the closest grids. FIG. 11B shows an example of the actual region 1120 from which features are extracted. As shown, that region 1120 conforms to the grid of the feature map 1100. This may result from, for example, performing the aforementioned [x/16] and [y/16] operations for each corner coordinates of the RoI 1110. Comparing the RoI 1110 shown in FIG. 11A to the actual region sampled 1120 in FIG. 11B, it should be clear that the two are at different locations with respect to the feature map 1100. In a similar manner, quantization of the bins within a sampled region also causes misalignment of the bins. For example, if the sampled region is to be divided into 2×2 bins 1131-1134 (or any other dimension, such as 7×7, 14×14, etc.), quantizing the bins' boundaries alters the dimensions of the bins and the sampling locations that they define. Then for each bin, features within that bin may be pooled to generate a representative feature. For example, max pooling may be used to select the largest feature within each bin. As shown in FIG. 11B, the quantized bins may not be uniform as intended and may introduce further misalignment. While the misalignments may not significantly impact classification, which is robust to small translations, they have a large negative effect on predicting pixel-accurate masks.

Figures 12A, 12B:
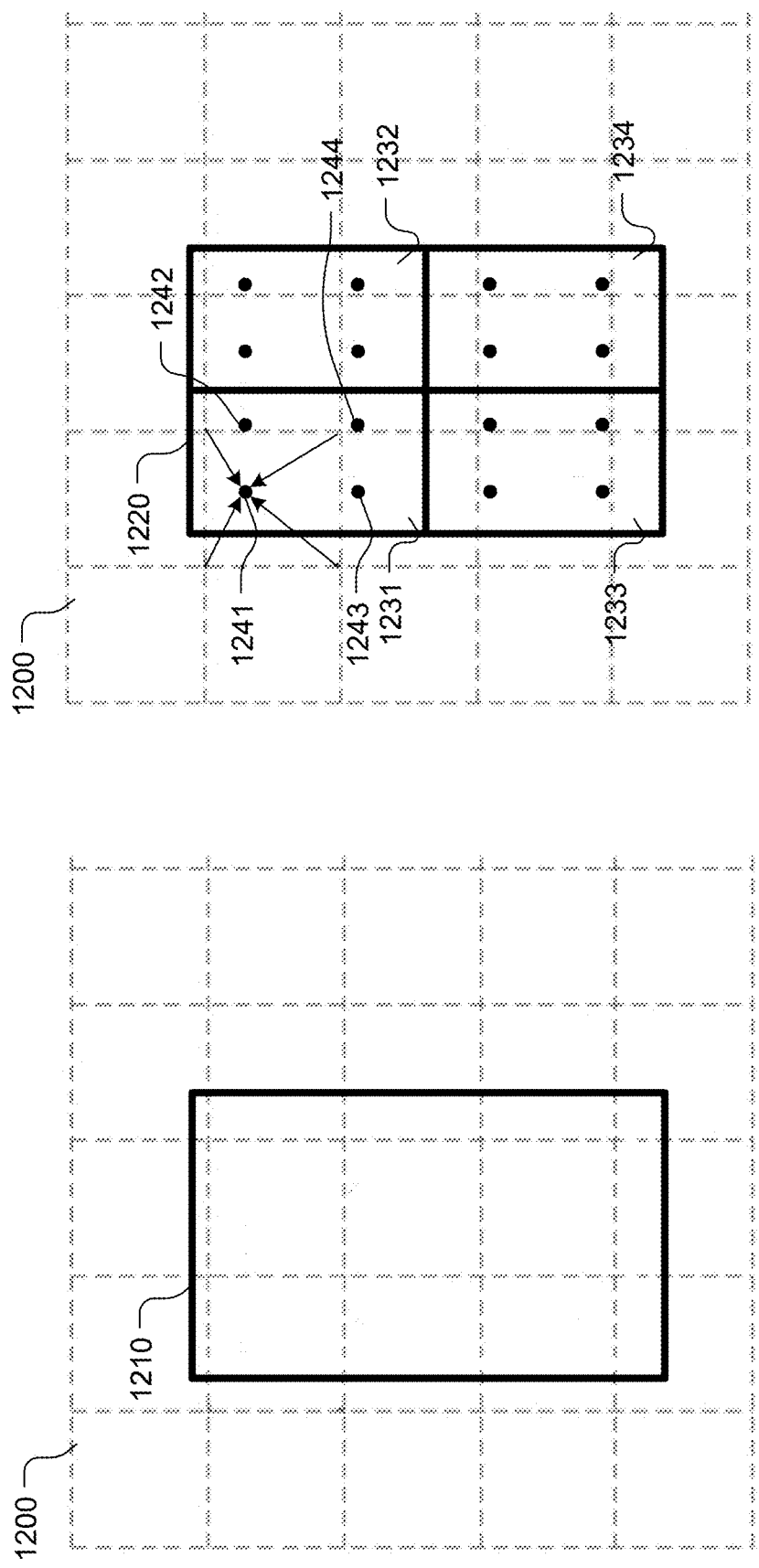
FIGS. 12A-12B illustrate an example result of feature extraction without quantization.

To address issues caused by misalignment, particular embodiments provide a RoIAlign layer that removes the harsh quantization of RoIPool by properly aligning the extracted features with the input. Particular embodiments may accomplish this by avoiding any quantization of the RoI boundaries or bins (e.g., use x/16 instead of [x/16]). To illustrate, FIGS. 12A-B show a simplified result of performing RoI feature extraction without quantization. FIG. 12A illustrates an RoI 1210, as proposed by the RPN, overlaid over a feature map 1200, which is represented as a dashed grid (as determined by the feature map's stride). FIG. 12B illustrates an example of the actual region 1220 from which features are extracted for the RoI. It should be appreciated that the RoI 1210 shown in FIG. 12A and the region 1220 in FIG. 12B are aligned exactly and correspond to the exact same region in the feature map 1200. This region 1220 may be determined, for example, by performing the aforementioned x/16 and y/16 operations for each corner coordinates of the RoI 1210. Comparing the RoI 1210 shown in FIG. 12A to the actual region sampled 1220 in FIG. 12B, it should be clear that the two are at the same location with respect to the feature map 1200. FIG. 12B further illustrates bins 1231-1234 (for simplicity, 2×2 bins are illustrated), which similarly are determined without quantization and are, therefore, properly aligned with their intended regions and dimensions, unlike the bins 1131-1134 shown in FIG. 11B. In particular embodiments, each bin may include any number of sampling locations. FIG. 12B shows four such sampling locations per bin (e.g., sampling points 1241-1244). RoIAlign computes the value of each sampling point based on their defined locations. For example, for each sampling point, RoIAlign may compute the value for that sampling point by bilinear interpolation from the nearby grid points on the feature map. Thus, no quantization is performed on any coordinates involved in the RoI boundary, the bins, or the sampling points.

Particular embodiments may use bilinear interpolation to compute the values of the input RoI features at predetermined, regularly sampled locations (e.g., the four sample points 1241-1244 in FIG. 12B) in each RoI bin. For example, to compute the feature value for bin 1231, RoIAlign may compute the values at each of the sample points 1241-1244 using bilinear interpolation. For example, to compute the value of each sampling point, RoIAlign may use bilinear interpretation from the nearby grid points on the feature map 1200. Since the illustrated example has four regular sample locations in each bin, RoIAlign may generate four corresponding values. In particular embodiments, the number of points sampled per bin may be more than four or less than four. In particular embodiments, the system may interpolate only a single value at each bin center (without pooling), which experimentally has been shown to be nearly as effective. Once the value for each sample point 1241-1244 has been determined, RoIAlign may compute the value for the associated bin 1231 by, e.g., aggregating the values associated with those sample points (e.g., using max or average pooling).

Figure 13B:
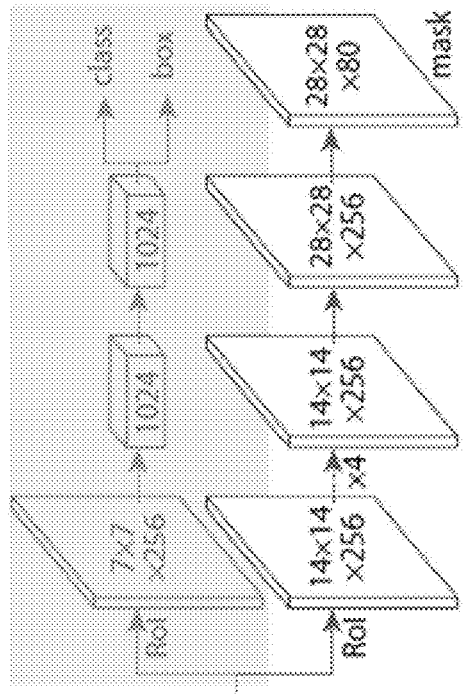
FIGS. 13A-13B illustrate examples of convolutional neural network architectures.
Figure 13A:
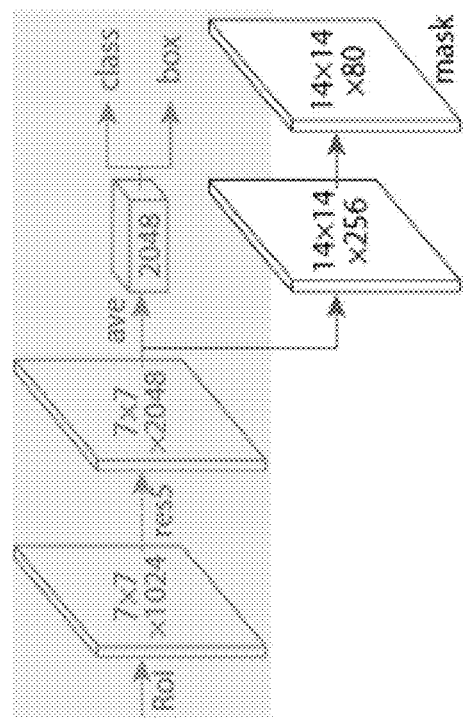

FIG. 13A-B illustrate convolutional neural network architectures used by particular embodiments of Mask R-CNN. Particular embodiments may instantiate Mask R-CNN with multiple architectures. For clarity, this disclosure differentiates between: (i) the convolutional backbone architecture used for feature extraction over an entire image, and (ii) the network heads for bounding-box recognition (including classification and regression used for determining bounding box size/location) and mask prediction that is applied separately to each RoI.

The backbone architecture is denoted herein using the nomenclature network-depth-features. Particular embodiments may be implemented on ResNet and ResNeXt networks of depth 50 or 101 layers. The original implementation of Faster R-CNN with ResNets extracted features from the final convolutional layer of the $4^{th}$ stage (C4). This backbone with ResNet-50, for example, is denoted by ResNet-50-C4. Particular embodiments may alternatively be implemented using the Feature Pyramid Network (FPN), which uses a top-down architecture with lateral connections to build an in-network feature pyramid from a single-scale input. Faster R-CNN with an FPN backbone extracts RoI features from different levels of the feature pyramid according to their scale, but otherwise the rest of the approach is similar to vanilla ResNet. Using a ResNet-FPN backbone for feature extraction with Mask R-CNN gives excellent gains in both accuracy and speed. For clarity, the backbone architectures for the embodiments shown in FIGS. 13A and 13B are not illustrated.

For the network head, particular embodiments may add a fully convolutional mask prediction branch. Specifically, particular embodiments may extend the Faster R-CNN heads. FIGS. 13A and 13B show the heads for the ResNet C4 and FPN backbones, respectively. In both figures, the respective heads take as input an RoI and output three predictions: a classification for the detected object in the RoI (denoted by "class" in the figures), a bounding box for the object (denoted by "box" in the figures), and a segmentation mask for the object (denoted by "mask" in the figures). For each embodiment shown, the three outputs are respectively generated by three branches in the network. The numbers in the figures denote spatial resolution and channels, and the arrows denote convolution, deconvolution, or fully-connected layers as can be inferred from context (e.g., convolution preserves spatial dimension while deconvolution increases it). For example, in FIG. 13B, the "×4" denotes a stack of four consecutive convolutions and the generation of the 28×28×256 map is by deconvolution. In particular embodiments, all convolutions are 3×3, except for the output convolution, which is 1×1. In particular embodiments, deconvolutions are 2×2 with stride 2. Particular embodiments may use ReLU in hidden layers. In particular embodiments, the head on the ResNet-C4 backbone includes the $5^{th}$ stage of ResNet (namely, the 9-layer "res5"), which is compute-intensive. As shown in FIG. 13A, "res5" denotes ResNet's fifth stage, which, for simplicity, is altered so that the first convolution operates on a 7×7 RoI with stride 1 (instead of, for example, 14×14/stride 2). For FPN, the backbone already includes res5 and thus allows for a more efficient head that uses fewer filters. In the examples shown, the mask generated using the ResNet-C4 backbone is 14×14×80 and the mask generated using the FPN backbone is 28×28×80.

Figure 14A:
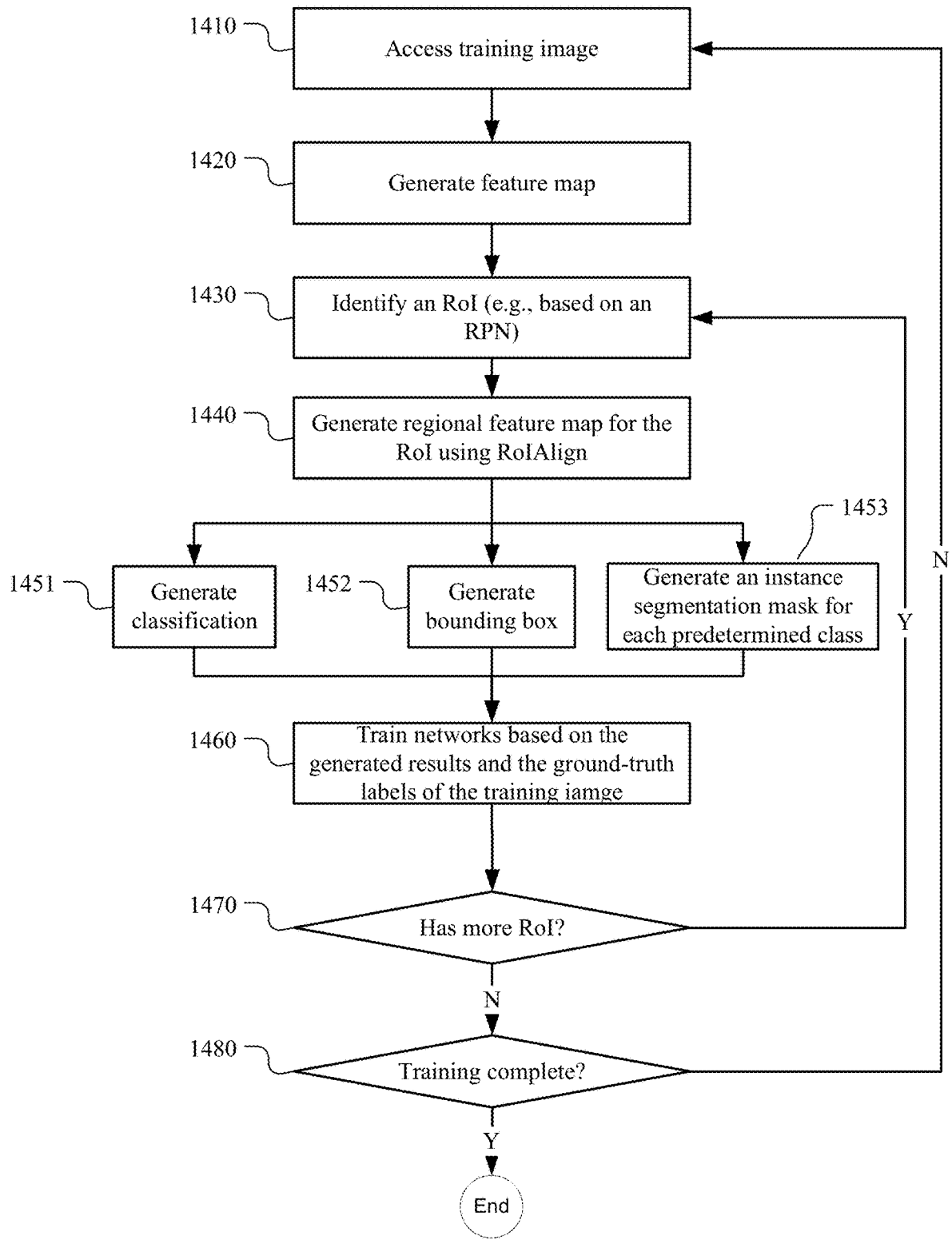
FIG. 14A illustrates an example method for training a machine-learning model for instance segmentation, detection, and classification.

FIG. 14A illustrate an example method for training Mask R-CNN. In particular embodiments, the method may begin at step 1410, where a computing system training Mask R-CNN may access a training image from a repository of training images. Each training image, for example, may be associated with ground-truth labels for comparison with results generated during training. For example, each training image may be associated with ground-truth bounding boxes identifying objects, classifications for each of the objects, and instance segmentation masks.

At step 1420, the system may generate a feature map for the training image. As described in further detail elsewhere herein, the feature map may be generated using a neural network, such as ResNet or FPN backbone. The feature map serves as an abstract representation of features of the training image, At step 1430, the system may identify any suitable number of proposed RoIs. In particular embodiments, the RoIs may be identified using an RPN. The RPN, like the one used in Fast R-CNN, may process the feature map of the training image using sliding anchors/boxes and output any number (e.g., hundreds or thousands) of RoIs. The RPN anchors may, by way of example and not limitation, span 5 scales and 3 aspect ratios. For convenient ablation, RPN may be trained separately and may not share features with Mask R-CNN, unless specified. As described herein, RPN and Mask R-CNN may have the same backbones and so they are shareable. In particular embodiments, each of the RoIs output by the RPN may be individually processed to predict a class, a bounding box, and a segmentation mask. In particular embodiments, a select number of RoIs (e.g., 100 or 1,000, etc.) may be processed and the rest (if any) may be discarded without further processing.

At step 1440, the system may generate a regional feature map for a select RoI using RoIAlign. For example, the regional feature map may be generated based on sampling locations (e.g., 1241-1244 shown in FIG. 12B) defined by a sampling region (e.g., 1220 shown in FIG. 12B). Since the regional feature map is generated by sampling without quantization, the sampling region and the region of interest align to the same region in the feature map (e.g., as shown by the RoI 1210 in FIG. 12A and the sampling region 1220 in FIG. 12B). Thus, the sampling region would align with the RoI even if a boundary of the region of interest is misaligned with any integer multiple of a stride of the feature map. For example, as shown in FIG. 12A, even if each of the four boundaries of the RoI 1210 is misaligned with the grid, the sampling region 1220 in FIG. 12 would still align with the RoI 1210. In particular embodiments, the sampling region may be divided into bins having equal dimensions, each of which defining a predetermined number of sampling locations (e.g., in FIG. 12B, each bin, such as 1231, has four sampling locations). The bins may also be defined without quantization, similar to the sampling region. Thus, even if a boundary of one of the bins is misaligned with any integer multiple of a stride of the feature map, the sampling locations defined by the bin would remain the same. In particular embodiments, the system, for each of the bins, may compute sampling values for the associated sampling locations, respectively, using bilinear interpolation. Then, for each of the bins, the system may compute a feature value based on the associated sampling values. The feature values associated with the bins may be used to generate the regional feature map for the RoI.

The system may then use the regional feature map to generate a classification prediction 1451, a bounding box prediction 1452, and instance segmentation mask prediction 1453. In particular embodiments, the system may generate a mask for each classification in a set of predetermined classifications (e.g., if there are 80 predetermined class, 80 corresponding instance segmentation masks may be generated). Similarly, particular embodiments may generate a bounding box for each classification. In particular embodiments, the system may generate a bounding box and a classification associated with the RoI by processing the regional feature using a neural network, such as fully connected layers. In particular embodiments, the system may generate instance segmentation masks associated with the RoI by processing the regional feature map using a second neural network, such as a fully convolutional network. An instance segmentation mask may be a pixel-wise binary classification of whether each pixel belongs to the instance or not.

At step 1460, the system may train the neural network branches used for generating the classification prediction, bounding box prediction, and masks prediction. In particular embodiments, the classification branch may be trained by processing the output of the fully connected layer (including the predicted classification) and the ground-truth classification using a softmax classifier. In particular embodiments, the loss function for classification predictions may be a log loss. In particular embodiments, the bounding box branch may be trained by processing the output of the fully connected layer (including the predicted bounding box) and the ground-truth bounding box using a bounding box regressor. In particular embodiments, the loss function for bounding box predictions may be based on a smooth L1 loss. In particular embodiments, the loss function for mask predictions may be based on mean binary cross-entropy. Based on the combined losses of the classification, bounding box, and mask predictions, the system may iteratively update the parameters of the neural network branches so that the losses are minimized.

In particular embodiments, as in Fast R-CNN, an RoI may be considered positive if it has IoU with a ground-truth box of at least 0.5 and negative otherwise. The mask loss $L_{mask}$ may be defined only on positive RoIs. The mask target may be the intersection between an RoI and its associated ground-truth mask. Particular embodiments may adopt image-centric training. Images may be resized such that their scale (shorter edge) is, by way of example and not limitation, 800 pixels. Each mini-batch may, by way of example and not limitation, have two images per GPU and each image may have N sampled RoIs, with a ratio of 1:3 of positive to negatives. By way of example and not limitation, N may be 64 for the C4 backbone and 512 for FPN. Particular embodiments may, by way of example and not limitation, train on 8 GPUs (so that the effective minibatch size is 16) for 160k iterations, with a learning rate of 0.02 which is decreased by 10 at the 120k iteration. Particular embodiments may, by way of example and not limitation, use a weight decay of 0.0001 and a momentum of 0.9.

At step 1470, the system may determine whether there are additional RoIs to process for the given training image. If so, then the system may repeat steps, starting from step 1430, to process the next RoI. If there are no more RoIs or sufficient number of RoIs have been processed for the training image, the system may move on to step 1480, where the system determines whether training is complete. Any suitable metric may be used to determine the termination of training. For example, training may terminate if all the training samples have been used and/or if the model's performance (e.g., as measured by the loss) is within a threshold range. If the system determines that training is not yet complete, it may iteratively train on the next image, starting again at step 1410. If instead the system determines that training is complete, training may terminate. Once the model has been trained, each of the branches may be used to perform what they have been trained to do. For example, once trained, the neural network of the mask branch (e.g., the fully convolutional network) would be configured to generate instance segmentation masks for object instances depicted in images.

Figure 14B:
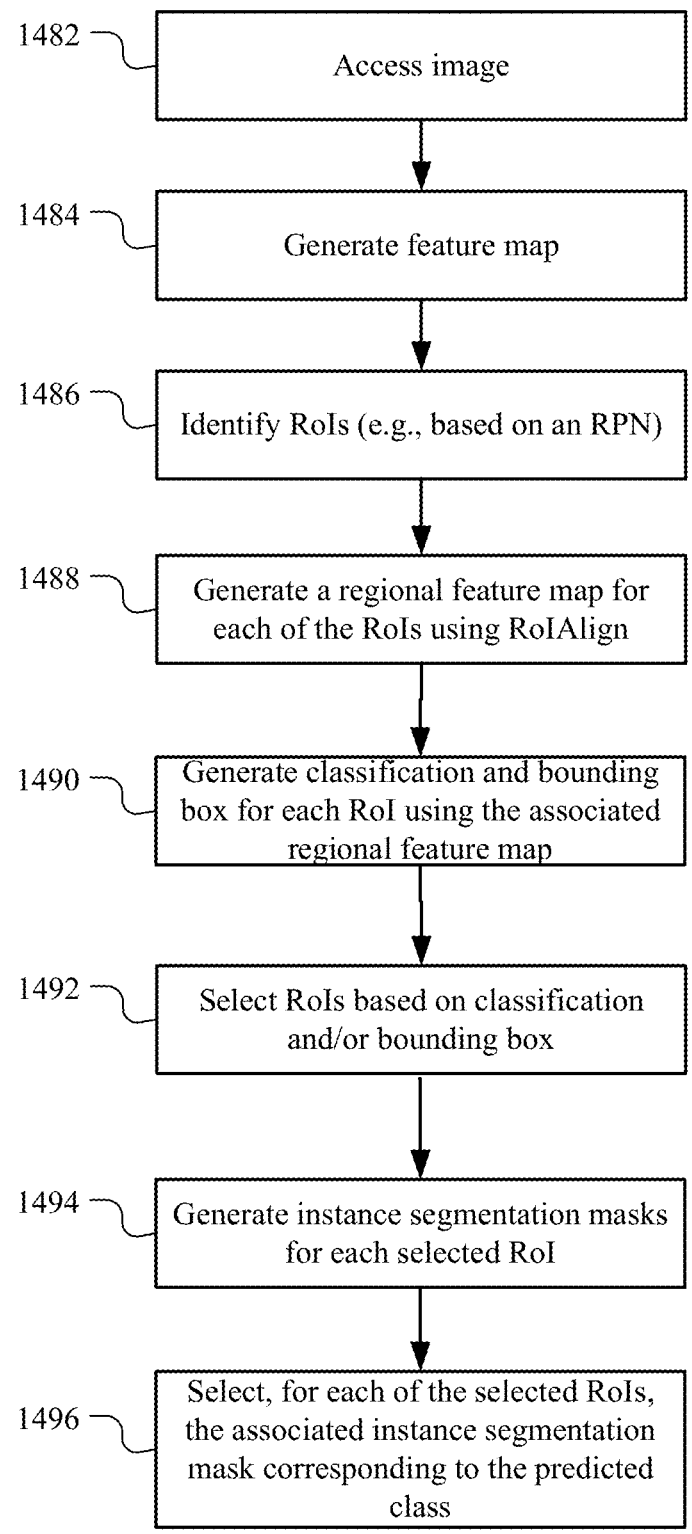
FIG. 14B illustrates an example method for using a trained machine-learning model for instance segmentation, detection, and classification.

Once the Mask R-CNN model has been trained, it may be used at inference time to detect object instances and generate associated segmentation masks and classifications. FIG. 14B illustrates an example inference-time use of a trained model. At step 1482, a system using the trained model may access an image of interest. At step 1484, the system may generate a feature map for the input image (e.g., using ResNet, FPN, or any other suitable network). At step 1486, the system may identify RoIs using an RPN. At step 1488, for each of the RoIs, the system may generate a regional feature map using RoIAlign. The system may then generate, for each RoI, a predicted classification, bounding box, and/or segmentation masks.

While the trained model is configured to generate all three in parallel, at inference time the system may, at step 1490, first generate a predicted classification and bounding box for each RoI. In certain circumstances (e.g., where the number of RoIs is large and/or there is a particular object class of interest), doing so may provide efficiency gains since the system would only need to generate masks for a subset of the RoIs that are deemed likely to be of interest. For example, the number of proposals may be, by way of example and not limitation, 300 for the C4 backbone and 1000 for the FPN backbone. Particular embodiments may run the box/classification prediction branch on these proposals, followed by non-maximum suppression. For example, at step 1492, the system may select RoIs based on confidence scores associated with the classification/bounding-box predictions (e.g., high confidence scores) and/or the particular classifications assigned (e.g., "people" or "cars"). The mask branch may then be applied to the highest scoring 100 detection boxes, for example. Although this differs from the parallel computation used in training, it may speed up inference and improve accuracy (due to the use of fewer, more accurate RoIs). For example, at step 1494, the system may generate instance segmentation masks for the subset of RoIs selected, rather than the full set of RoIs. At step 1496, the system may select, for each of the selected RoIs, the associated instance segmentation mask that corresponds to the predicted class. For example, the mask branch may predict K masks per RoI, but particular embodiments may only use the $k^{th}$ mask, where k is the predicted class by the classification branch. For example, for a particular RoI, the system may generate K masks that correspond to K predetermined classifications (e.g., a mask for an instance of "people," another mask for an instance of "car," etc.). If the classification branch predicts that the RoI likely depicts a car, then the mask associated with the "car" class may be selected for output. The m×m floating-number mask output may then be resized to the RoI size, and binarized at a threshold of 0.5, by way of example and not limitation.

Figure 15A:
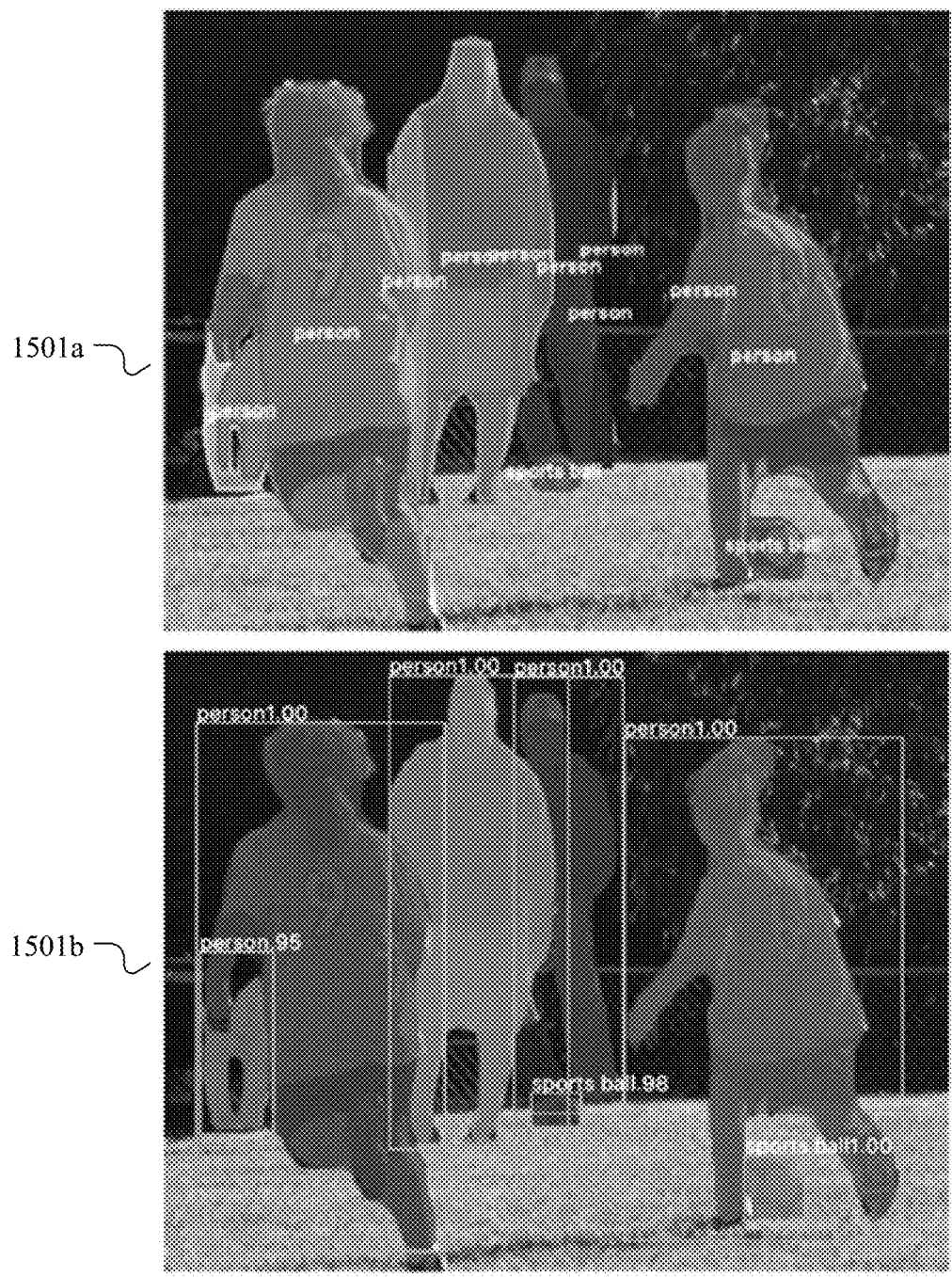
FIGS. 15A-C illustrate various comparative results of example segmented images with overlapping masks.
Figure 15B:
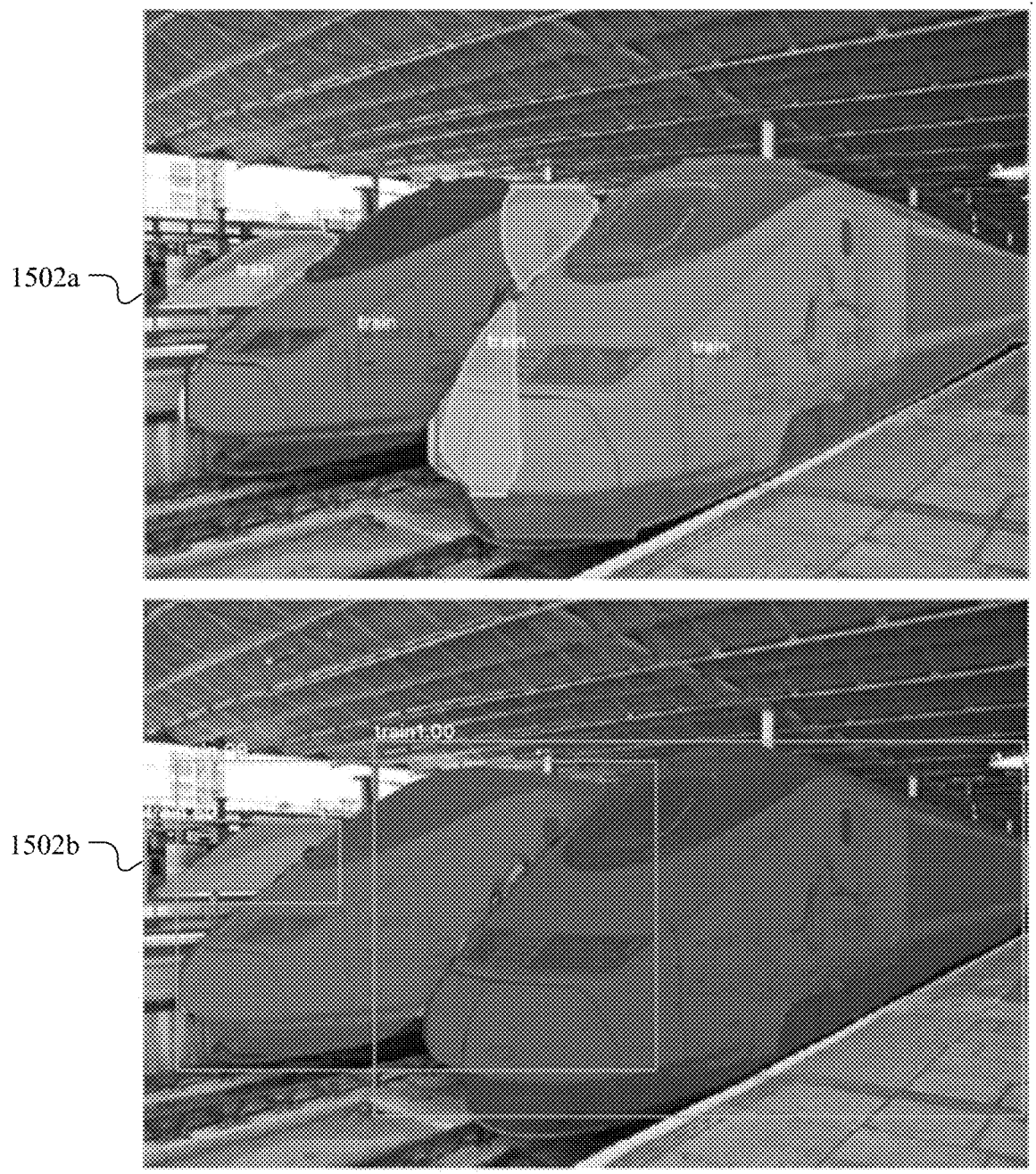
Figure 15C:
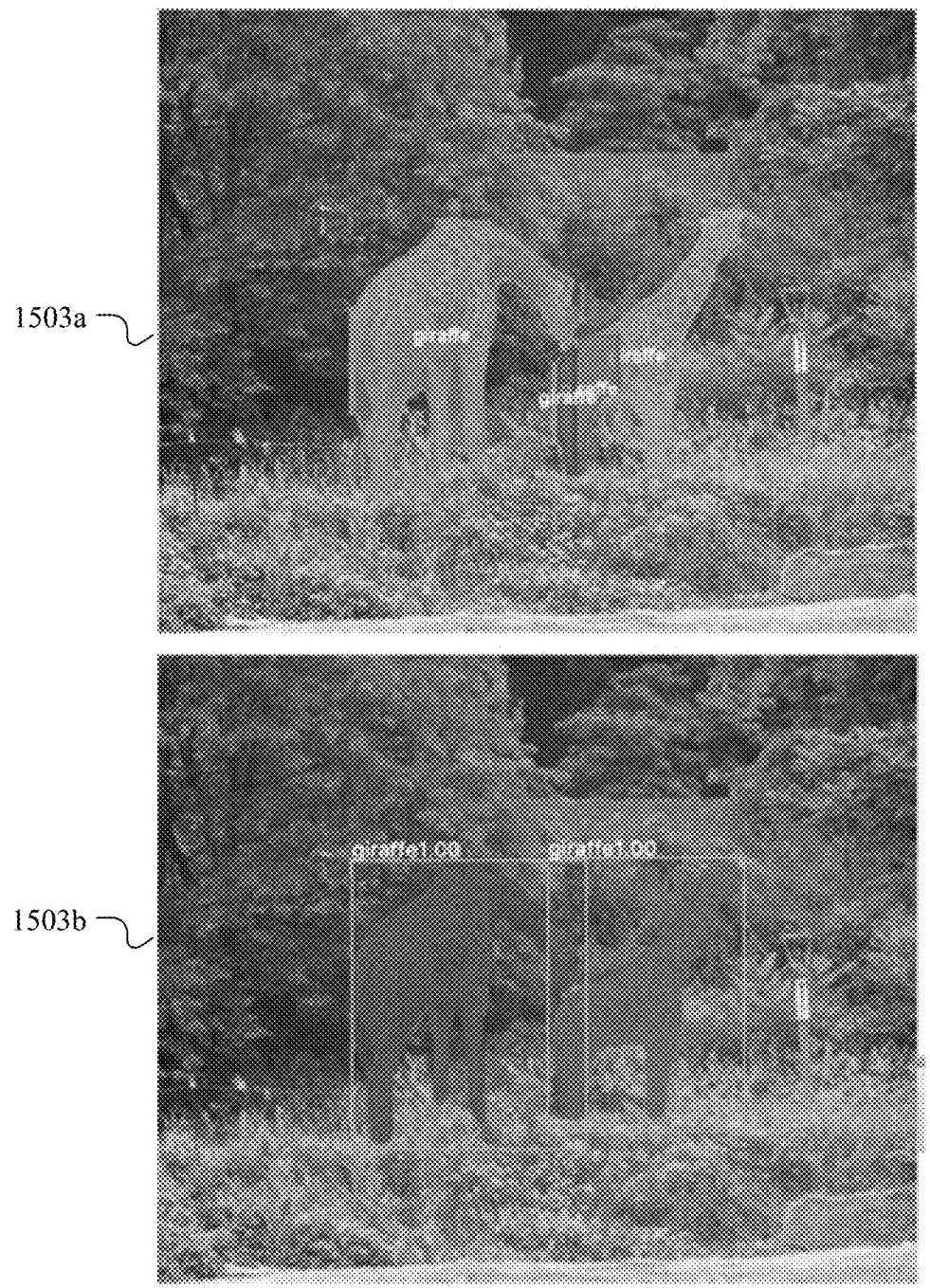

Experiments using particular embodiments of Mask R-CNN have shown significant improvements over existing systems. For example, Mask R-CNN with ResNet-101-FPN backbone may outperform FCIS+++, which includes multi-scale train/test, horizontal flip test, and online hard example mining (OHEM). FIGS. 15A-C illustrate various comparative results of example segmented images with overlapping masks as between Mask R-CNN (the bottom images in the figures, labeled 1501b-1503b) and FCIS+++(top images in the figures, labeled 1501a-1503a). FCIS+++ exhibits systematic artifacts on overlapping instances, suggesting that it is challenged by the fundamental difficulty of instance segmentation. In contrast, the results generated by particular embodiments of Mask R-CNN do not show such artifacts.

Ablation experiments also demonstrate that various features of Mask R-CNN are responsible for the observed improvements in performance. First, by experimenting with different backbone architectures, it has been observed that, in general, Mask R-CNN benefits from deeper networks (e.g., ResNet 101 performs better than ResNet 50) and advanced designs (e.g., FPN outperforms C4 features, and ResNeXt improves on ResNet).

Further ablation experiments focused on the effects of computing independent masks versus multinomial masks. As described herein, particular embodiments of Mask R-CNN may decouple mask and class prediction: as the existing box branch predicts the class label, particular embodiments may generate a mask for each class without competition among classes (e.g., by a per-pixel sigmoid and a binary loss). Masks generated using Mask R-CNN were compared to masks generated using a per-pixel softmax and a multinominal loss (e.g., as used in FCN), which couples the tasks of mask and class prediction. Based on experimental results, it is shown that generating multinomial masks results in a significant loss in mask average precision (AP) by 5.5 points. In particular embodiments of Mask R-CNN, once the instance has been classified as a whole (by the box branch), it may be sufficient to predict a binary mask without concern for the categories, which may make the model easier to train. This in turn improves the performance of the trained model.

Particular embodiments predict class-specific masks (i.e., one m×m mask per class). In particular embodiments, Mask R-CNN with class-agnostic masks (i.e., predicting a single m×m output regardless of class) may be effective as well. This further highlights the division of labor described herein, which largely decouples classification and segmentation.

Ablation tests were also performed to evaluate the effect of using RoIAlign. RoIAlign is compared with conventional RoIPool, and results have shown that RoIAlign improves mask AP by 3 points over RoIPool. Additionally, RoIAlign is compared with RoIWarp (with bilinear sampling), which still quantizes the RoI and thereby loses alignment with the input. Mask predictions resulting from RoIWarp performs much worse than RoIAlign, thus highlighting the significance of proper alignment.

Tests were also performed using backbone architectures with large stride (e.g., 32 pixels, 16 pixels, etc.). Since larger stride causes more severe misalignment in conventional systems, it has been observed that RoIAlign improves mask accuracy significantly over RoIPool (e.g., by 7.3 points or 50% relative improvement). Thus, RoIAlign largely resolves the long-standing challenge of using large-stride features for detection and segmentation. Even with networks with finer multi-level strides (e.g., FPN), RoIAlign still shows a gain of 1.5 mask AP and 0.5 box AP.

With respect to bounding box detection, experiments have also shown that Mask R-CNN outperforms conventional systems. One experiment fully trains Mask R-CNN, including the classification branch, bounding-box branch, and mask branch. At inference time, only the classification and bounding-box outputs were used (the mask output was ignored). Mask R-CNN using ResNet-101-FPN outperformed the base variants of previous state-of-the-art models, including the single-model variant of G-RMI. Using ResNeXt-101-FPN, Mask R-CNN further improved results. As a further comparison, a version of Mask R-CNN without the mask branch was trained (but RoIAlign was still used). Experiments have shown that this model performed better than conventional ones. Thus, the improvements can be attributed to RoIAlign alone. It has also been shown that this embodiment of Mask R-CNN without the mask branch performed 0.9 points box AP lower than Mask R-CNN with the mask branch. This gap illustrates the benefit of multitask training.

Figure 16:
FIG. 16 illustrates an example segmented image with keypoint-based masks.

Particular embodiments of Mask R-CNN may also be extended to provide human-pose estimations. FIG. 16 illustrates an example segmented image with keypoint-based masks (e.g., indicating the pose of detected humans). Particular embodiments may model a keypoint's location as a one-hot mask, and adopt Mask R-CNN to predict K masks, one for each of K keypoint types (e.g., left shoulder, right elbow). Particular embodiments may make minor modifications to the segmentation system when adapting it for keypoints. For each of the K keypoints of an instance, the training target may be a one-hot m×m binary mask where only a single pixel is labeled as foreground. During training, for each visible ground-truth keypoint, particular embodiments minimize the cross-entropy loss over an $m^2$-way softmax output (which encourages a single point to be detected). As in instance segmentation, the K keypoints may still be treated independently. Particular embodiments may adopt the ResNet-FPN variant, and the keypoint head architecture may be similar to that shown in FIG. 13B. By way of example and not limitation, the keypoint head consists of a stack of eight 3×3 512-d convolution layers, followed by a deconvolution layer and 2×bilinear upscaling, producing an output resolution of 56×56. In particular embodiments, a relatively high-resolution output (compared to masks) may be required for keypoint-level localization accuracy.

Figure 17:
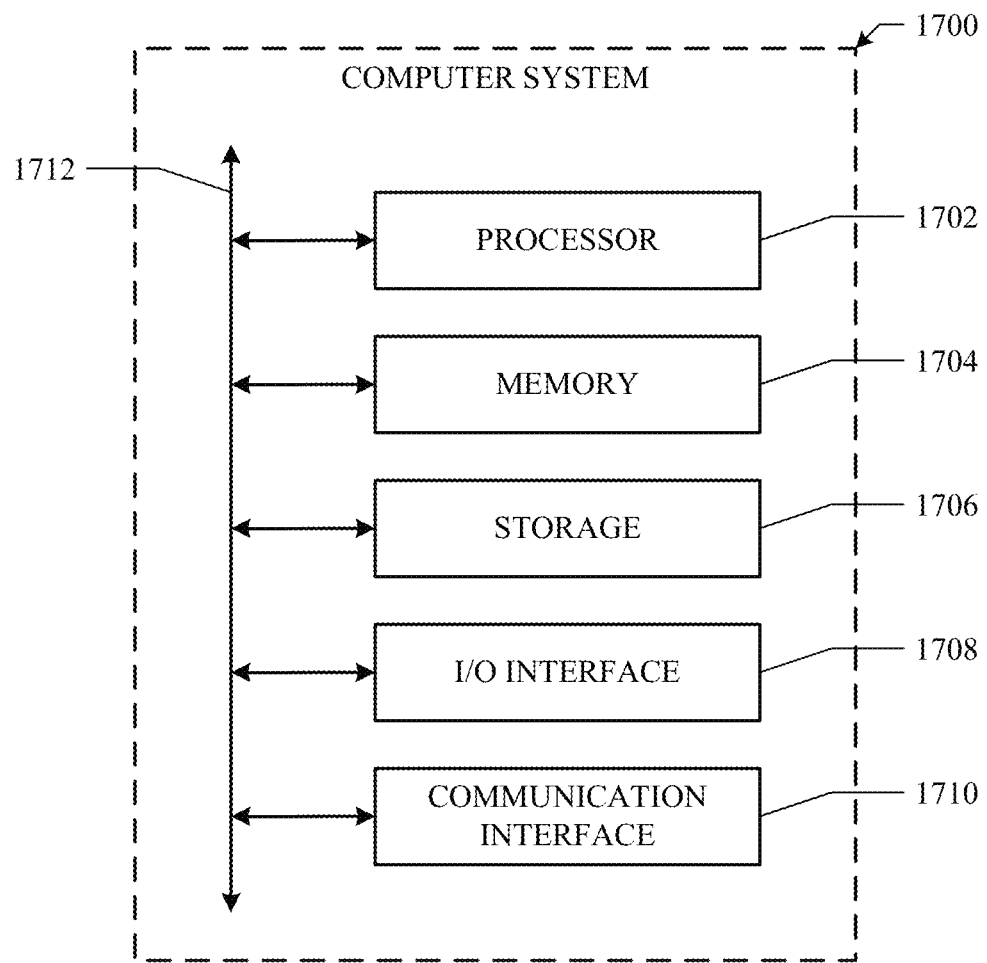
FIG. 17 illustrates an example computer system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   accessing a training image;
   generating a feature map for the training image using a first neural network;
   identifying a region of interest in the feature map;
   generating a regional feature map for the region of interest based on sampling locations defined by a sampling region, wherein the sampling region and the region of interest align to the same region in the feature map;
   generating an instance segmentation mask associated with the region of interest by processing the regional feature map using a second neural network; and
   training the second neural network using the instance segmentation mask;
   wherein the trained second neural network is configured to generate instance segmentation masks for object instances depicted in images.

2. The method of claim 1, wherein at least one boundary of the region of interest is misaligned with any integer multiple of a stride of the feature map.

3. The method of claim 1,
   wherein the sampling region is divided into bins having equal dimensions; and
   wherein each of the bins defines a predetermined number of the sampling locations.

4. The method of claim 3, wherein at least one boundary of one of the bins is misaligned with any integer multiple of a stride of the feature map.

5. The method of claim 3, further comprising:
   for each of the bins, computing sampling values for the associated sampling locations, respectively, using bilinear interpolation;
   for each of the bins, computing a feature value based on the associated sampling values;
   wherein the regional feature map is generated based on the feature values associated with the bins.

6. The method of claim 1, further comprising:
   generating a bounding box associated with the region of interest by processing the regional feature map;
   generating a classification associated with the region of interest by processing the regional feature map;
   wherein the bounding box, the classification, and the instance segmentation mask are generated in parallel.

7. The method of claim 1, further comprising:
   generating a plurality of instance segmentation masks associated with the region of interest for a plurality of predetermined object classes, respectively, wherein the instance segmentation mask is one of the plurality of instance segmentation masks;

wherein the training of the second neural network is based on a loss function defined based on the plurality of instance segmentation masks.

8. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
 accessing a training image;
 generating a feature map for the training image using a first neural network;
 identifying a region of interest in the feature map;
 generating a regional feature map for the region of interest based on sampling locations defined by a sampling region, wherein the sampling region and the region of interest align to the same region in the feature map;
 generating an instance segmentation mask associated with the region of interest by processing the regional feature map using a second neural network; and
 training the second neural network using the instance segmentation mask;
 wherein the trained second neural network is configured to generate instance segmentation masks for object instances depicted in images.

9. The system of claim 8, wherein at least one boundary of the region of interest is misaligned with any integer multiple of a stride of the feature map.

10. The system of claim 8,
 wherein the sampling region is divided into bins having equal dimensions; and
 wherein each of the bins defines a predetermined number of the sampling locations.

11. The system of claim 10, wherein at least one boundary of one of the bins is misaligned with any integer multiple of a stride of the feature map.

12. The system of claim 10, wherein the processors are further operable when executing the instructions to perform operations comprising:
 for each of the bins, computing sampling values for the associated sampling locations, respectively, using bilinear interpolation;
 for each of the bins, computing a feature value based on the associated sampling values;
 wherein the regional feature map is generated based on the feature values associated with the bins.

13. The system of claim 8, wherein the processors are further operable when executing the instructions to perform operations comprising:
 generating a bounding box associated with the region of interest by processing the regional feature map;
 generating a classification associated with the region of interest by processing the regional feature map;
 wherein the bounding box, the classification, and the instance segmentation mask are generated in parallel.

14. The system of claim 8, wherein the processors are further operable when executing the instructions to perform operations comprising:
 generating a plurality of instance segmentation masks associated with the region of interest for a plurality of predetermined object classes, respectively, wherein the instance segmentation mask is one of the plurality of instance segmentation masks;
 wherein the training of the second neural network is based on a loss function defined based on the plurality of instance segmentation masks.

15. One or more computer-readable non-transitory storage media embodying software that is operable when executed to cause one or more processors to perform operations comprising:
 accessing a training image;
 generating a feature map for the training image using a first neural network;
 identifying a region of interest in the feature map;
 generating a regional feature map for the region of interest based on sampling locations defined by a sampling region, wherein the sampling region and the region of interest align to the same region in the feature map;
 generating an instance segmentation mask associated with the region of interest by processing the regional feature map using a second neural network; and
 training the second neural network using the instance segmentation mask;
 wherein the trained second neural network is configured to generate instance segmentation masks for object instances depicted in images.

16. The media of claim 15, wherein at least one boundary of the region of interest is misaligned with any integer multiple of a stride of the feature map.

17. The media of claim 15,
 wherein the sampling region is divided into bins having equal dimensions; and
 wherein each of the bins defines a predetermined number of the sampling locations.

18. The media of claim 17, wherein the software is further operable when executed to cause the one or more processors to perform operations comprising:
 for each of the bins, computing sampling values for the associated sampling locations, respectively, using bilinear interpolation;
 for each of the bins, computing a feature value based on the associated sampling values;
 wherein the regional feature map is generated based on the feature values associated with the bins.

19. The media of claim 17, wherein the software is further operable when executed to cause the one or more processors to perform operations comprising:
 generating a bounding box associated with the region of interest by processing the regional feature map;
 generating a classification associated with the region of interest by processing the regional feature map;
 wherein the bounding box, the classification, and the instance segmentation mask are generated in parallel.

20. The media of claim 15, wherein the software is further operable when executed to cause the one or more processors to perform operations comprising:
 generating a plurality of instance segmentation masks associated with the region of interest for a plurality of predetermined object classes, respectively, wherein the instance segmentation mask is one of the plurality of instance segmentation masks;
 wherein the training of the second neural network is based on a loss function defined based on the plurality of instance segmentation masks.

\* \* \* \* \*